(12) United States Patent
Fink et al.

(10) Patent No.: US 10,243,412 B1
(45) Date of Patent: Mar. 26, 2019

(54) BEAMFORMING RECTENNAS, SYSTEMS AND METHODS FOR WIRELESS POWER TRANSFER

(71) Applicant: The United States of America as represented by the Administrator of the National Aeronautics and Space Administration, Washington, DC (US)

(72) Inventors: Patrick W. Fink, Missouri City, TX (US); Gregory Y. Lin, Friendswood, TX (US); Timothy F. Kennedy, Houston, TX (US); Phong H. Ngo, Friendswood, TX (US); Haley C. Boose, League City, TX (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 378 days.

(21) Appl. No.: 15/247,562

(22) Filed: Aug. 25, 2016

Related U.S. Application Data

(60) Provisional application No. 62/210,821, filed on Aug. 27, 2015.

(51) Int. Cl.
*H01F 27/42* (2006.01)
*H02J 50/27* (2016.01)
(Continued)

(52) U.S. Cl.
CPC .............. *H02J 50/27* (2016.02); *H02J 7/025* (2013.01); *H04B 7/04* (2013.01); *H04B 7/0456* (2013.01); *H04B 7/0617* (2013.01)

(58) Field of Classification Search
CPC .................................................... H02J 50/27
(Continued)

(56) References Cited

U.S. PATENT DOCUMENTS 3,434,678 A   3/1969   Brown et al.
3,989,994 A   11/1976  Brown
(Continued)

FOREIGN PATENT DOCUMENTS

JP   2009038924 A   2/2009
JP   2013081367 A   5/2013

OTHER PUBLICATIONS

Ahn et. al. "Prototype of 5.8 GHz Wireless Power Transmission System for Electric Vehicle System," Proc. of IEEE International Conference on Environmental Science & Technology (ICEST), 2011, pp. 1-5.
(Continued)

*Primary Examiner* — Rexford Barnie
*Assistant Examiner* — Dru Parries
(74) *Attorney, Agent, or Firm* — Kurt G. Hammerle; Edward K. Fein; Mark P Dvorscak

(57) ABSTRACT

A passive beamforming rectenna includes a plurality of antennas, a plurality of terminal port rectifying circuits, and a beamforming network. The beamforming network includes (a) a plurality of antenna ports connecting to the plurality of antennas, and (b) a plurality of terminal ports connecting to the plurality of terminal port rectifying circuits. The beamforming network further includes a microwave lens or any of a variety of other structures. The beamforming rectenna is characterized by a plurality of radiation distribution patterns. Electromagnetic power is received through the plurality of antennas. The beamforming network directs the received electromagnetic power, in substantial portion, to a subset of the plurality of terminal ports associated with particular radiation distribution patterns whose amplitudes, in the direction from which the electromagnetic power was received, are large relative to the
(Continued)

amplitudes, in the same direction, of other radiation distribution patterns associated with other terminal ports.

25 Claims, 11 Drawing Sheets

(51) Int. Cl.
*H04B 7/06* (2006.01)
*H04B 7/04* (2017.01)
*H04B 7/0456* (2017.01)
*H02J 7/02* (2016.01)

(58) Field of Classification Search
USPC .......................................................... 307/104
See application file for complete search history.

(56) References Cited

U.S. PATENT DOCUMENTS

| | | | |
|---|---|---|---|
| 4,360,741 | A | 11/1982 | Fitzsimmons et al. |
| 5,218,374 | A | 6/1993 | Koert et al. |
| 6,492,940 | B2 | 12/2002 | Mikami et al. |
| 6,919,847 | B2 | 7/2005 | Caplan et al. |
| 6,936,760 | B2 | 8/2005 | Rogers |
| 6,967,462 | B1 | 11/2005 | Landis |
| 7,068,991 | B2 | 6/2006 | Parise |
| 7,744,032 | B2 | 6/2010 | Quinn et al. |
| 7,888,586 | B2 | 2/2011 | Yamamoto et al. |
| 8,074,936 | B2 | 12/2011 | Criswell |
| 8,115,683 | B1 | 2/2012 | Stefanakos et al. |
| 8,447,234 | B2 | 5/2013 | Cook et al. |
| 8,448,894 | B2 | 5/2013 | LaForge |
| 8,469,122 | B2 | 6/2013 | Perlman et al. |
| 8,558,661 | B2 | 10/2013 | Zeine |
| 8,634,928 | B1 | 1/2014 | O'Driscoll et al. |
| 8,653,784 | B2 | 2/2014 | Bland |
| 2006/0238365 | A1 | 10/2006 | Vecchione et al. |
| 2010/0289342 | A1 | 11/2010 | Maness |
| 2012/0153731 | A9 | 6/2012 | Kirby et al. |
| 2012/0326660 | A1 | 12/2012 | Lu et al. |
| 2013/0342025 | A1 | 12/2013 | Cook et al. |
| 2014/0015344 | A1 | 1/2014 | Mohamadi |
| 2014/0203758 | A1 | 7/2014 | Moshfeghi |
| 2016/0099614 | A1* | 4/2016 | Leabman ............... H01Q 1/243 307/104 |

OTHER PUBLICATIONS

Shinohara et al., "Mid-Distance Wireless Power Transmission for Electric Truck via Microwaves," EMTS Proceedings of 2013 USRI International Symposium on. IEEE, 2013, pp. 841-843.

Hasarrnani, "Wireless Power Transmission for Solar Power Satellite," National Journal, 2010-2011, pp. 37-42.

Saidivya et al., "Microwave Power Transmission—A Next Generation Power Transmission System," UST, KLUniversity, Department of Electronics and Communications, Vijayawada, Malaysia, 2014, vol. 7, Issue 1, pp. 54-61.

Shinohara, "Beam Efficiency of Wireless Power Transmission via Radio Waves from Short Range to Long Range," J. Korean Institute of Electromagnetics Engineering and Science 10.4, 2011, pp. 224-230.

Kawahara et al., "Virtualizing Power Cords by Wireless Power Transmission and Energy Harvesting," Radio and Wireless Symposium (RWS), IEEE, 2014, pp. 37-39.

Carvalho et al., "Wireless Power Transmission: R&D Activities Within Europe," IEEE Transactions on Microwave Theory and Techniques, vol. 62, No. 4, Apr. 2014, pp. 1031-1045.

* cited by examiner

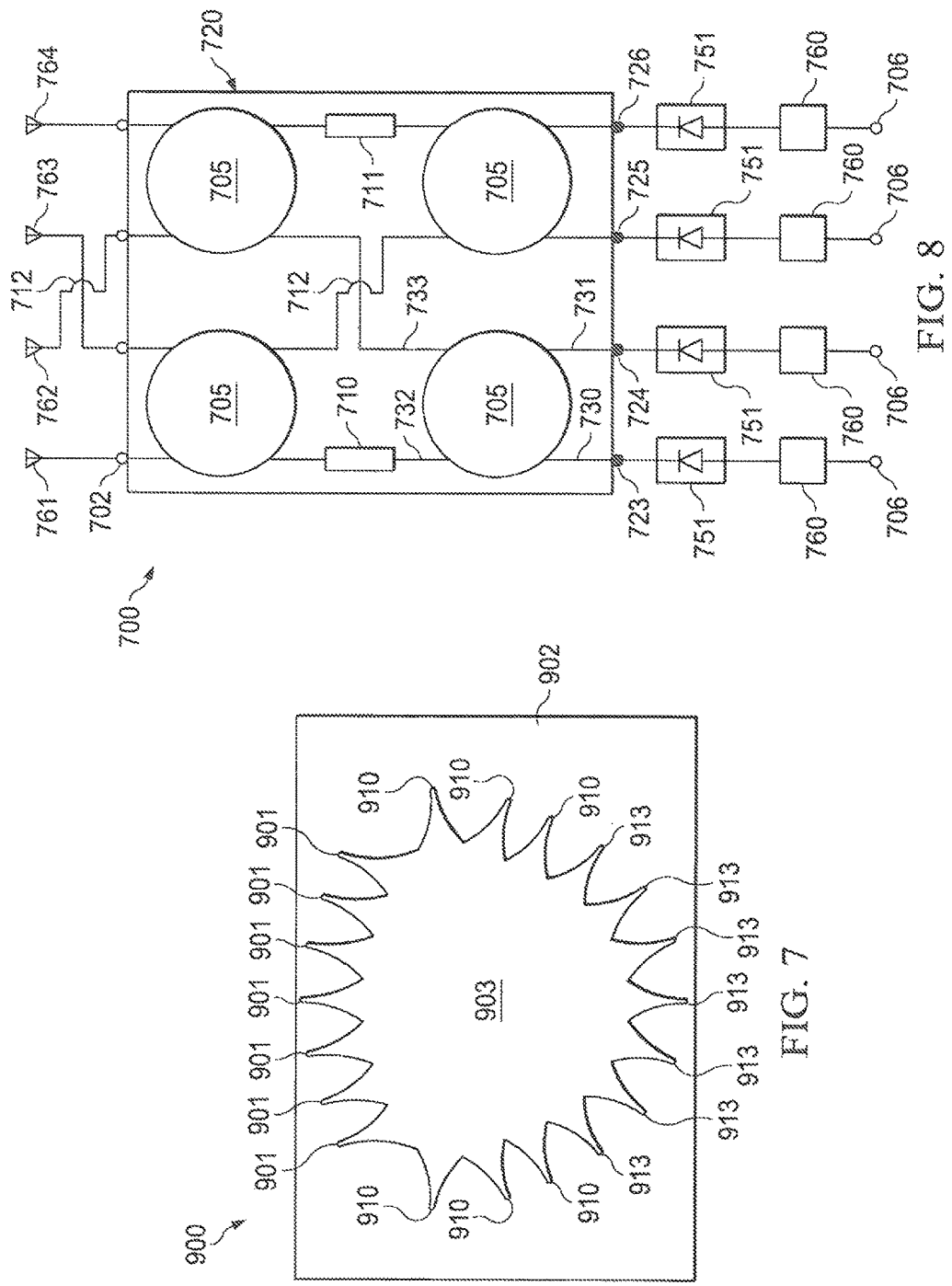

BEAMFORMING RECTENNAS, SYSTEMS AND METHODS FOR WIRELESS POWER TRANSFER

CROSS-REFERENCE TO RELATED PATENT APPLICATIONS

This application claims priority to U.S. Provisional Application Ser. No. 62/210,821 titled "Beamforming Rectenna, System and Method for Transfer of Electromagnetic Power," filed on Aug. 27, 2015, and incorporated herein by reference. This application is related to U.S. patent application Ser. No. 14/201,402, titled "Systems, Apparatuses, and Methods for Beamforming RFID Tags," filed on Mar. 7, 2014, and incorporated herein by reference.

ORIGIN OF THE INVENTION

The invention described herein was made by employees of the United States government and may be manufactured and used by or for the government of the United States of America for governmental purposes without the payment of any royalties thereon or therefor.

FIELD OF THE DISCLOSURE

The embodiments described herein relate generally to far-field wireless power transfer. More particularly, the disclosure relates to beamforming rectennas for far-field wireless power transfer.

BACKGROUND OF THE DISCLOSURE

Transfer of power between two points in space without the use of wire or other physical tethering has long been a goal of humankind. This transfer of power is referred to as wireless power transfer (WPT). In near-field WPT, power is transferred over short distances by magnetic fields using inductive coupling between coils of wire or by electric fields using capacitive coupling between electrodes. Near-field WPT may be referred to as non-radiative WPT. In far-field WPT, power is transmitted over long distances by beams of electromagnetic radiation, utilizing antennas and rectifiers. Far-field WPT may also be referred to as radiative WPT or (microwave) power beaming.

Far-field WPT may be used to transfer power from a source (transmitter) to one or more power consumers (receivers), where a "consumer" is defined as a device that utilizes the power to perform some task or that stores the power for future use. In far-field WPT, it is sufficient if the distance between the transmitting source antenna and the consumer receive antenna is such that each antenna resides in or near the radiating far-field of the other. The device associated with the reception and rectification of the transmitted power is typically referred to as a rectenna. A rectenna typically comprises a receiving antenna and a rectifier circuit. Sometimes the term "rectenna" also implies functionality associated with power management, e.g., voltage regulation.

Near-field WPT tends to be more efficient than far-field WPT. However, far-field WPT enables transfer of power over much greater distances and hence enables applications fundamentally different from those enabled by near-field WPT, e.g., space-based power transmission to terrestrial or planetary surfaces, transmission from a base to a robot, and transmission from a base to enable an RFID (radio frequency identification) tag or a battery-less sensor tag. Increases in efficiency of far-field WPT are highly desired to make such applications more practical and to enable additional applications.

SUMMARY OF THE DISCLOSURE

Embodiments disclosed herein provide systems, apparatuses and methods for wireless transfer of power using beamforming rectennas.

According to a first aspect of the disclosure herein, a system is provided including a beamforming rectenna. The beamforming rectenna includes a plurality of antennas, a plurality of terminal port rectifying circuits, and a beamforming network. The beamforming network includes (a) a plurality of antenna ports connecting to the plurality of antennas, and (b) a plurality of terminal ports connecting to the plurality of terminal port rectifying circuits. The beamforming network is configured to direct electromagnetic power received via the plurality of antennas and the plurality of antenna ports to a subset of the plurality of terminal ports.

According to a second aspect of the disclosure, a method for wireless transfer of power is provided. The method is for use with a beamforming rectenna. The beamforming rectenna includes a plurality of antennas, a plurality of terminal port rectifying circuits, and a beamforming network. The beamforming network includes (a) a plurality of antenna ports connecting to the plurality of antennas, and (b) a plurality of terminal ports connecting to the plurality of terminal port rectifying circuits. The method includes the following operations: by one or more of the plurality of antennas and one or more of the plurality of antenna ports, receiving electromagnetic power; by the beamforming network, directing the electromagnetic power to a subset of the plurality of the terminal ports and thence toward a subset of the plurality of the terminal port rectifying circuits; and by the subset of the plurality of terminal port rectifying circuits, rectifying the electromagnetic power.

Other aspects and advantages of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, wherein:

FIG. 7 is a schematic diagram, in accordance with one or more embodiments described herein, of a Rotman lens beamforming network.

FIG. 8 is a schematic diagram, in accordance with one or more embodiments described herein, of a beamforming rectenna in which the beamforming network is a Butler matrix.

NOTATION AND NOMENCLATURE

Figure 1:
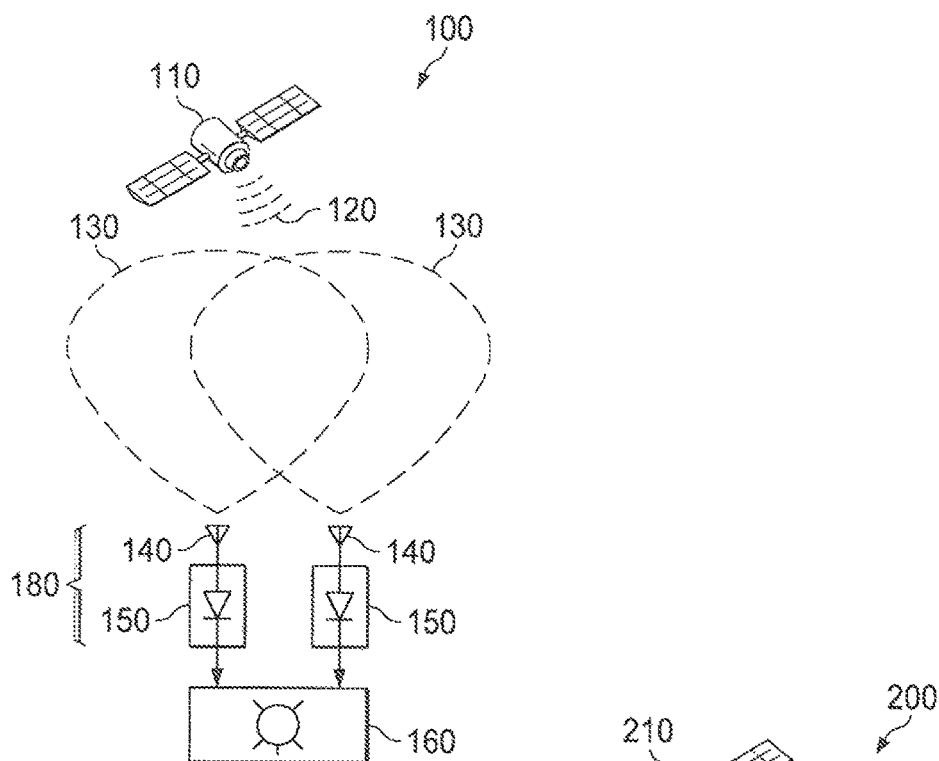
FIG. 1 is an illustration of a WPT system comprising multiple, fixed, broad-beam rectennas.

Certain terms are used throughout the following description and claims to refer to particular system components and configurations. As one skilled in the art will appreciate, the same component may be referred to by different names. This description does not intend to distinguish between components that differ in name but not function. In the following description and in the claims, the terms "including" and "comprising" are used in an open-ended fashion, and thus should be interpreted to mean "including, but not limited to . . . ." The word "or" is used in the inclusive sense (i.e., "and/or") unless a specific use to the contrary is explicitly stated.

It should be noted that the terms "radio frequency" (RF) and "microwave" are used interchangeably herein. The term "DC" is used in reference to electromagnetic power, current, or voltage characterized by a frequency of zero, e.g., direct current. The word "rectenna" is used to refer to the combination of receive antenna or antennas in conjunction with an element that rectifies the received signal to produce a signal that has a non-zero level of DC power. The term "electromagnetic power" may be used broadly to cover both electromagnetic radiation through free space (e.g., air) and electrical signals conveyed through a material element such as a wire, cable, transmission line, waveguide, etc. In this regard, the term "electromagnetic power" may be used with reference to a beamforming rectenna to refer to both electromagnetic energy in the form of radiation (e.g., at the antennas) and the corresponding electromagnetic energy in (i.e., having been converted to) the form of an electrical signal (e.g., at the terminal ports), and thus the term "electromagnetic power" may be used as a shorthand to cover the fact that the electromagnetic energy undergoes such conversion in the beamforming rectenna. In some cases, as will be clear from context, other terms (e.g., "power" and "energy") may also be used in the same manner as described here for the term "electromagnetic power." The phrase "power management circuit" is used in a general sense herein to convey a circuit that conditions, regulates, or proportions a power signal for the purpose of absorption by a load. The phrase "power management system" may also be used to refer to a power management circuit, although the phrase "power management system" may also be used to denote a broader distribution or collection of power management circuits.

Although there is not unanimous concurrence regarding the definition of "waveguides" and "transmission lines," the consensus opinion amongst skilled artisans is that transmission lines are a subset of waveguides that propagate, predominantly, transverse electromagnetic (TEM) waves. Herein, the term "transmission line" is used in a more general sense to denote an elongated device for transferring electromagnetic energy between two pieces of equipment, regardless of the specific propagation modes established within the elongated device.

The terms "pattern," "antenna pattern," "(antenna) radiation distribution pattern" or the like used herein pertain to the radiation distribution produced over a solid angular region by injecting electromagnetic energy within a specific operating frequency band or set of operating frequency bands into one of the terminal ports of the beamforming rectenna (described below). Due to reciprocity characteristics of passive antennas, an antenna receive pattern is identical to the transmitting pattern so that reference to a "pattern" pertains to both transmission and reception through the beamforming device and antenna. The pattern may comprise one or more primary beams, wherein "beam" is used to denote a pattern of radiation density over an angular span that contains a peak radiation density, and "beam" can also be described as a major lobe. In some embodiments described herein, a pattern may contain multiple lobes or beams, each lobe or beam characterized by a local maximum of radiation density. It should be noted that in this disclosure (1) the radiation distribution pattern (or the like term) of a beamforming rectenna refers to an element that is different from (2) the radiation distribution pattern of an antenna (or individual antenna element). With the exception of the description of FIGS. 1 and 2, this disclosure generally speaks of radiation distribution patterns (or the like term) of a beamforming rectenna, not of an antenna. Accordingly, where the term "radiation distribution pattern" or the like term is used without specifying as to whether it refers to (1) or (2), it should be understood as referring to (1) unless dictated otherwise, e.g., by context.

For the purposes of this disclosure, the term "active" refers to an element that requires a delivered source of energy or power in order to operate or fulfill a function, wherein "delivered" refers to electrical power provided by a battery or power supply. Similarly, the term "passive" refers to an element that does not require delivery of electrical power to energize or operate. An element that powers itself through rectification of alternating current electromagnetic energy is not considered passive herein, nor is any element that otherwise scavenges energy and converts it to electromagnetic energy for the purpose of energizing itself. A passive device may receive energy, e.g., electromagnetic radiation, and transmit it and may also act on the received energy in a way that dissipates some of the received energy. Thus, a passive device may dissipate energy, or it may neither add nor appreciably dissipate significant energy. An example of an active device is a phased array of antennas with electrically powered beamsteering circuitry. Examples of passive devices are the beamforming networks disclosed herein. A beamforming network may also be referred to as a beamformer.

The term "beam steering," "steering" (or the like or grammatical variants thereof), when used with reference to embodiments described herein, refers to the fact that the beamforming network can be designed to orient a characteristic beam in a specified direction, but the direction of that particular characteristic beam is essentially fixed upon development of the beamforming rectenna. In this regard, it should be noted that the beamforming rectenna implements a set of multiple, discrete, fixed beams. This usage of these terms and this mode of operation of the beamforming rectenna and beamforming network stands in contrast to an active beam steering device or arrangement that continuously steers (changes direction of) a beam or changes direction of a beam over time during operation. Whereas an active beamforming device does not require a plurality of ports, a passive beamforming network such as those described in this disclosure requires a plurality of terminal ports in order to sample beams that collectively cover the desired spatial region. One significant advantage of the passive beamforming network is that the circuitry is greatly simplified since the passive network does not require power or control signals. Another advantage is that the passive network does not waste received RF power by rectifying it in order to power active circuitry components. Yet another advantage is that the passive network can simultaneously receive power on multiple beams, each beam corresponding to a different spatial region, without added complication to the beamforming network.

As used herein, the term "connect" and the like, and the terms "input" and "output" and variants thereof, may signify an electrical connection or coupling, as will be understood by one of ordinary skill in the art in view of this disclosure.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and the omission may not be explicitly noted in all cases.

While various embodiments are described herein, it should be appreciated that the present disclosure encompasses many inventive concepts that may be embodied in a wide variety of contexts. The following detailed description of exemplary embodiments, read in conjunction with the accompanying drawings, is merely illustrative and is not to be taken as limiting the scope, as it would be impossible or impractical to include all of the possible embodiments and contexts. Upon reading this disclosure, many alternative embodiments will become apparent to persons of ordinary skill in the art. The scope of the present invention is defined by the appended claims and equivalents thereof.

Illustrative embodiments are described below. In the interest of clarity, not all features of an actual implementation for all embodiments are necessarily described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

A general description of some embodiments disclosed herein is given immediately below, followed by a more specific description of embodiments with reference to the drawings appended hereto. Descriptions of the beamforming rectenna and beamforming network, their components, and their associated elements, which are provided in this general description generally apply to the beamforming rectenna systems described herein with reference to FIGS. 3-14, even though in some cases the more specific description of embodiments provided with reference to the drawings may omit some of the detail provided in the general description.

Methods, apparatuses, and systems for wireless power transfer (WPT) using beamforming rectennas, are disclosed, including a WPT system comprising (i) a source transmitter and (ii) one or more beamforming rectennas. In this WPT system, each of the beamforming rectennas comprises a plurality of antennas (e.g., an antenna array), a plurality of terminal port circuits, and a single beamforming network. The beamforming network comprises a plurality of antenna ports connecting to the plurality of antennas, respectively, and a plurality of terminal ports connecting to the plurality of terminal port circuits, respectively. Each of the terminal port circuits comprises one or more rectifying circuits and may be referred to herein as a terminal port rectifying circuit. In some embodiments, the output of each terminal port circuit is connected to a respective power management circuit. In other embodiments, the outputs of multiple terminal port circuits or of all the terminal port circuits are connected to a single power management system.

The beamforming rectenna is characterized by a plurality of radiation distribution patterns, or receive antenna beams. Each of the radiation distribution patterns is associated with one (or more) of the plurality of terminal ports, and each of the terminal ports is associated with one of the plurality of radiation distribution patterns. The shape of each radiation distribution pattern is determined by the design of the beamforming network, the design of each of the plurality of antennas (and hence the radiation distribution pattern of each of the plurality of antennas), and the location and orientation of each of the plurality of antennas. Incident electromagnetic radiation received through the plurality of antennas from a given direction, or at a given angle of incidence, is directed by the beamforming network, in a substantial portion, to the terminal port(s) associated with one or more specific radiation distribution patterns whose amplitudes in the given direction are greater than amplitudes, in the given direction, of some or all of the other radiation distribution patterns, or, put another way, one or more specific radiation distribution patterns whose peak amplitudes are more closely aligned with the given angle of incidence than are the peak amplitudes of some or all of the other radiation distribution patterns. Terminal ports associated with radiation distribution patterns that are of a substantially lesser intensity (have substantially lesser amplitude) in the specified direction, but are non-zero, will also receive some of the incident electromagnetic radiation but at a reduced, and possibly insignificant, level. It is also possible for the antennas to concurrently receive electromagnetic radiation from multiple directions and to direct the received electromagnetic radiation to the plurality of terminal ports associated with those directions. This property of the beamforming rectenna enables increased efficiency, especially in highly reflective environments in which the beamforming rectenna may receive high levels of electromagnetic energy from multiple directions. In some cases, there is a one-to-one correspondence between the radiation distribution patterns of the beamforming rectenna and the terminal ports: each radiation distribution pattern is associated with a single terminal port, and each terminal port is associated with a single radiation distribution pattern. In some of these cases, where electromagnetic radiation is received from directions in which two or more radiation distribution patterns overlap spatially at similar amplitudes, the received electromagnetic power may be distributed to the multiple terminal ports associated with these overlapping radiation distribution patterns. Power of a sufficient threshold level reaching given terminal ports is rectified by the terminal port circuits connected to the given terminal ports, respectively. Those terminal port circuits receiving sufficient power to permit rectification may be referred to henceforth as "activated terminal port circuits," and the terminal ports connected to those terminal port circuits may be referred to henceforth as "activated terminal ports."

In an exemplary set of embodiments, for any given angle of incidence of radiation, the cumulative radiation received by the plurality of antennas will be directed by the beamforming network toward a proper subset of the plurality of terminal ports, which may be henceforth referred to as the "preferred terminal ports." The terminal port circuits respectively connected to the preferred terminal ports may be henceforth referred to as the "preferred terminal port circuits." Other terminal ports that, for a given angle of incidence of radiation, are not preferred terminal ports, may still be activated terminal ports, because a number of factors determining the power incident on the terminal port circuits may result in a sufficiently high level of power for rectification even on those terminal ports that are not preferred. Such factors would be those that result in a high level of power density at the antennas and may include a short range between the source transmitter and the rectenna, a suitably high transmit power from the source transmitter, and/or a suitably high antenna gain for the source transmitter.

The subset of terminal port circuits that are preferred terminal port circuits is determined by (i) the angle of incidence of the electromagnetic wave impinging on the antennas, relative to a coordinate reference system defined in terms of the antennas' positions, (ii) the design of the beamforming network, (iii) the design of the plurality of antennas, and (iv) the location and orientation of each of the plurality of antennas. For example, these factors determine the amount of overlap of the characteristic radiation distribution patterns or beams. If two characteristic beams overlap at a sufficiently high level at the angle of incidence, then the electromagnetic power received at the angle of incidence (and hence through the overlapping portion of these two beams) will be directed toward the terminal ports associated with both of these beams (and hence toward the corresponding terminal port circuits) and these terminal ports and terminal port circuits will become activated. In some instances, the angle of incidence of the electromagnetic wave impinging on the antennas is approximately the angle defined by the line-of-sight between the rectenna and the source transmitter. In other instances, the angle of incidence might coincide with a reflection from an obstacle in the environment. It is possible for the beamforming rectenna to concurrently receive and rectify energy from a direct line-of-sight transmission of a source transmitter and from one or more reflections. It is also possible for the beamforming rectenna to concurrently receive and rectify energy from two or more source transmitters (and the respective lines-of-sight between the transmitters and the rectenna may define different angles of incidence of the electromagnetic wave impinging on the antennas). In some embodiments, in any case in which the beamforming rectenna is receiving power along multiple angles of incidence, and the power at each of those angles is of the same frequency, each of those angles of incidence may coincide with a distinct beam, respectively, of the plurality of characteristic beams of the beamforming rectenna.

In some embodiments, the beamforming network is a Rotman lens. In some embodiments, the beamforming network is a Ghent lens. In some embodiments, the beamforming network comprises RF dividers and combiners. In some embodiments, the beamforming network is a matrix of transmission lines and hybrid couplers. In some embodiments, the matrix of transmission lines and couplers is a Butler matrix. In some embodiments, a matrix of transmission lines and directional couplers forms a Blass beamforming network.

In some embodiments, a multi-faceted structure supports a beamforming rectenna on each face thereof, and the beamforming rectenna on each face provides antenna coverage over a predetermined angular span such that the collective beamforming rectenna over the multi-faceted structure provides coverage over a predetermined angular span that exceeds the span of the composite of the single antenna beams associated with a single face. The beamforming rectenna on any given face may comprise a linear array of antennas, and each of the beamforming rectennas of the entire multi-faceted structure may comprise a linear array of antennas. The linear array of antennas on one face may or may not be collinear with the linear array of antennas on another face.

In some embodiments, the terminal port circuit is a half-wave rectifying circuit. In other embodiments, the terminal port circuit is a full-wave rectifying circuit. In some embodiments, the terminal port circuit is a full-wave Greinacher rectifier using zero-bias Schottky diodes. In some embodiments, the rectifying circuit includes one or more diodes and one or more capacitors, which may serve to store the charge and condition or filter the DC component. In some embodiments, the outputs of the terminal port rectifying circuits are connected to one or more power management circuits (whether respectively to multiple power management circuits, collectively to a single power management circuit, or in groups to multiple power management circuits, respectively). The power management circuit(s) may condition and/or regulate the power received from the terminal port rectifying circuits. In some embodiments, the power management circuit for an activated terminal port rectifying circuit receives the rectified input signal from the terminal port rectifying circuit and provides a DC source that is regulated to a fixed voltage. In some embodiments, the power management circuit comprises a boost regulator at the output of each terminal circuit. Each power management circuit that receives a rectified signal sufficiently strong to permit the power management circuit to suitably regulate the signal to a predetermined DC voltage level may henceforth be referred to as an "activated power management circuit". In some embodiments, the DC power from each power management circuit may be used, independently of the DC power from the other power management circuits, to power a load attached to the particular power management circuit. In alternate embodiments, a single load may tap DC power from multiple power management circuits associated with the same beamforming network, wherein those power management circuits that are active supply current to the single load. In other alternate embodiments, a single load may tap DC power from multiple power management circuits from a plurality of beamforming rectennas. In other embodiments, the output from each terminal port rectifying circuit may be provided as input to a single power management system.

FIG. 1 illustrates a wireless power transfer (WPT) system 100 including a source transmitter 110 and a rectenna 180. Rectenna 180 includes one or more antennas 140 (two depicted) and one or more rectifying circuits 150 (two depicted). The antennas 140 are electrically coupled to the rectifying circuits 150, respectively. A given antenna 140 and a given rectifying circuit 150 that are coupled together may be referred to as corresponding elements. System 100 also includes one or more power management circuits or systems 160 (one depicted), which may or may not be deemed part of rectenna 180. Accordingly, the numbers of the various elements shown in FIG. 1 are merely examples, and system 100 may comprise other numbers of any of these elements. There need not be a one-to-one correspondence of elements 140 and 150. Each antenna 140 is characterized by a fixed radiation distribution pattern or beam 130 of a certain angular extent.

Transmitter 110 transmits RF electromagnetic radiation 120, a portion of which is received by antennas 140. The portion of electromagnetic radiation 120 received by a given antenna 140 is converted to AC power by the antenna 140 and then transmitted to corresponding rectifying circuit 150, which rectifies the AC power, i.e., converts it to DC power. The rectified power is transmitted to power management system 160, which aggregates the rectified power and regulates or conditions it.

As depicted, antennas 140 are low directivity, wide beam antennas. Each radiation pattern 130 is sufficiently wide so as to provide power to each rectifying circuit 150 even as the angle from the transmitter 110 to the antenna 140 varies substantially. Accordingly, system 100 may accommodate a transmitter 110 that is mobile, i.e., that moves relative to antennas 140. However, while a low directivity antenna 140 has a wide beam that accommodates mobility of the transmitter 110, it also yields a lower amount of power, compared to a highly directive antenna, and hence provides a lower amount of power to rectifying circuit 150 (e.g., relative to a high gain antenna, described below). This characteristic results in a lower efficiency of rectifying circuit 150. Indeed, if the amount of power received by rectifying circuit 150 is too low, it is not rectified at all or the resulting voltage is too low to be useful.

As also seen in FIG. 1, in system 100 the power received from the multiple antennas 140 is combined at a DC or near-DC level, that is, after it has been rectified. As will be understood from this disclosure, alternative arrangements are possible in which the power is combined prior to rectification.

Figure 2:
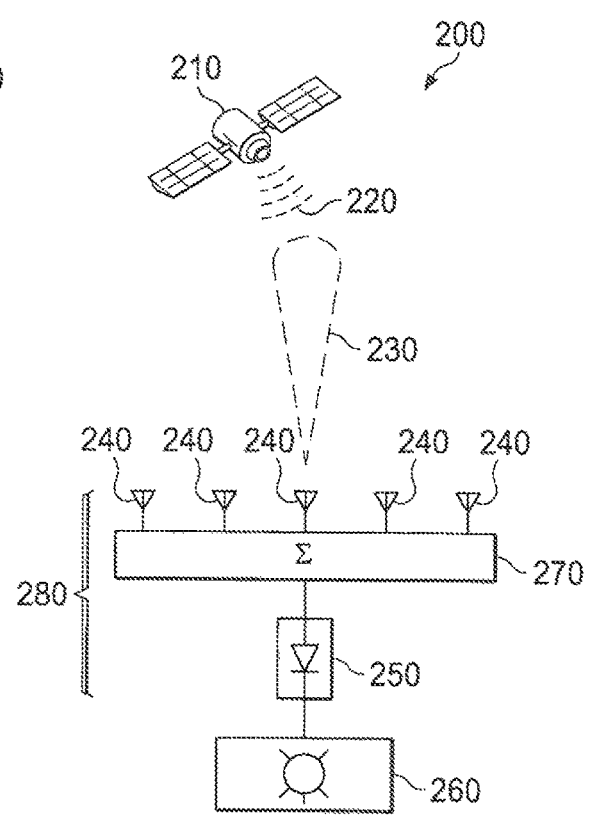
FIG. 2 is an illustration of a WPT system comprising a single, fixed, narrow-beam rectenna.

FIG. 2 illustrates a WPT system 200 including a source transmitter 210 and a rectenna 280. Rectenna 280 includes a plurality or array of antennas (or antenna elements) 240, an RF power combiner 270, and a rectifying circuit 250. The antennas 240 are each electrically coupled to the RF power combiner 270, which in turn is electrically coupled to the rectifying circuit 250. System 200 also includes a power management system 260, which is electrically coupled to rectifying circuit 250.

Transmitter 210 transmits RF electromagnetic radiation 220, a portion of which is received by antennas 240. The RF power combiner 270 combines the RF signals from all of the antennas 240 and outputs the combined signal to rectifying circuit 250. In turn, rectifying circuit 250 outputs a single signal to power management circuit 260, which regulates or conditions the rectified power.

The array of antennas 240 comprises a single, narrow- and fixed-beam antenna aperture, characterized by radiation distribution pattern or beam 230 (the number of antennas 240 may differ from that depicted). Radiation distribution pattern 230 is of a narrow angular extent relative to radiation distribution pattern 130. A single antenna element with an effective aperture the same as that of the array of antennas 240 could be used to achieve a substantially equivalent antenna, i.e., characterized by a narrow, fixed radiation distribution pattern such as 230.

Thus, in contrast to low gain, wide beam antennas 140, antenna 240 is a high gain, narrow beam antenna. Accordingly, the RF power delivered to the rectifying circuit 250 may be substantially greater than the power delivered to the rectifying circuit 150, so long as the electromagnetic radiation from the source transmitter 210 arrives at rectenna 280 within an angular region centered near the peak of radiation distribution pattern 230 (and assuming the same source transmitter power, the same source transmitter antenna gain, and the same range between rectenna and source transmitter).

However, while the high gain, narrow beam antenna may allow operation of the rectifying circuit at a higher efficiency, delivering more power, it does not accommodate mobility of the source transmitter 220. When the angle at which electromagnetic radiation arrives at the rectenna 280 from the source transmitter 210 deviates substantially from the peak of the narrow beam antenna pattern 230, the amount of power outputted by rectenna 280, and hence the performance of the system 200, decreases substantially. Thus, to achieve a good level of performance, practically speaking, system 200 would require that the transmitter 210 remain stationary relative to rectenna 280 or that the narrow beam 230 be steered to track the transmitter 210.

In addition to the high gain, narrow band rectenna 280 versus the low gain, wide band rectenna 180, another difference between system 200 and system 100 is that in the former the power is combined before rectification (at 270), whereas in the latter the power is combined after rectification (at 160). As noted, rectifying circuits can operate at a higher efficiency when there is a higher power input to the rectifying circuit.

Figure 3:
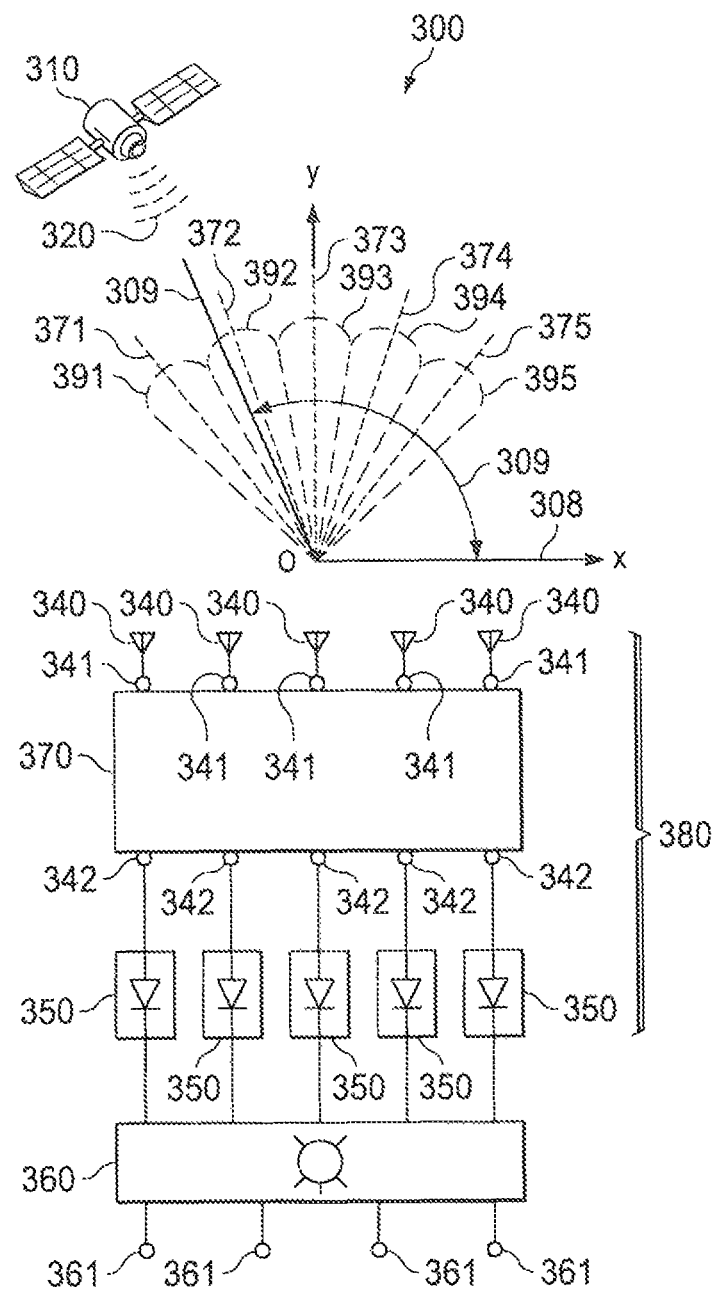
FIG. 3 is a schematic diagram, in accordance with one or more embodiments described herein, of a WPT system incorporating a beamforming rectenna.

FIG. 3 illustrates a WPT system 300 according to one or more embodiments of the present disclosure. System 300 differs from systems 100 and 200 by including, inter alia, a beamforming network 370. System 300 includes a source transmitter 310, a beamforming rectenna (or beamforming rectenna system) 380, and a power management system 360. Beamforming rectenna 380 includes a plurality of antennas 340, a plurality of antenna ports 341, beamforming network 370, a plurality of terminal ports 342, and a plurality of terminal port rectifying circuits 350. As depicted, each antenna 340 is connected to a respective antenna port 341, each terminal port 342 is connected to a respective terminal port rectifying circuit 350, and each terminal port rectifying circuit 350 outputs to power management system 360. Power management system 360 outputs to output ports 361. Although only a single symbolic element is indicated at each output port 361, each output port 361 may represent two or more electrical lines required for signal distribution.

The beamforming rectenna 380 may have a (fixed) characteristic set of antenna radiation distribution patterns, such as is illustrated in FIG. 3 in a simplified manner in the form of single beams or major lobes 391, 392, 393, 394 and 395. In some embodiments, beamforming rectenna 380 may have antenna radiation distribution patterns of types different from those illustrated in FIG. 3. The antenna radiation distribution patterns of beamforming rectenna 380 are described in further detail below.

Transmitter 310 transmits power in the form of RF or microwave electromagnetic radiation 320, at least a portion of which is received by the plurality of antennas 340 of beamforming rectenna 380. The received power is transferred from antennas 340 to corresponding antenna ports 341 of beamforming network 370. The beamforming network 370 directs a substantial portion of the aggregate received power to a subset of the plurality of beamforming terminal ports 342, the subset being determined according to the angle of incidence 309 (described below) of the received radiation 320, the design of beamforming network 370, the design of antennas 340, and the location and orientation of antennas 340. The design of the beamforming network 370, in concert with the placement and spacing of the antenna elements, results in an array pattern, or array factor, that, when multiplied by the pattern of antenna elements 340, leads to the rectenna radiation patterns or characteristic beams 391, 392, 393, 394, and 395, each of which is associated with a terminal port 342. Through the use of the multiple characteristic beams 391, 392, 393, 394 and 395, beamforming rectenna 380 provides the advantage of a higher RF power to the one or more terminal rectifying circuits 350 as compared to system 100 shown in FIG. 1. In addition, the total angular span of the set of characteristic beams 391, 392, 393, 394 and 395 may be greater than the span achieved with a single fixed narrow beam such as beam 230 of system 200 of FIG. 2. Accordingly, in contrast to systems 100 and 200, beamforming rectenna 380 provides a high gain receive antenna that is also able to accommodate a mobile source transmitter 310, i.e., a source transmitter 310 that moves relative to antennas 340. Furthermore, beamforming rectenna 380 achieves this result as a passive device. That is, beamforming rectenna 380 (or more specifically, beamforming network 370 and antennas 340) effectively tracks a mobile transmitter 310 without employing active circuitry or other active elements, e.g., for steering the rectenna beam. Beamforming rectenna 380 (notably beamforming network 370 and antennas 340) comprises only passive elements, that is, elements that do not require delivery of electrical power to energize or operate. An element that powers itself through rectification of alternating current electromagnetic energy is not considered passive herein, nor is any element that otherwise scavenges energy and converts it to electromagnetic energy for the purpose of energizing itself. While it is possible to derive active beamforming rectennas using scavenged electromagnetic power, these beamformers suffer from reduced efficiency as they necessarily extract incoming electromagnetic energy to power and operate the active elements. In this regard, beamforming rectenna 380 implements a set of multiple, discrete, fixed beams, as contrasted with an active beam steering device or arrangement that continuously steers (changes direction of) a beam or changes direction of a beam over time during operation. The use of the term "beamformer" as applied herein is intended to imply a passive network that implements a plurality of beams, each of which may be uniquely associated with a different output, or "terminal", port. Thus, the RF power combiner in FIG. 2 would not meet the definition of "beamformer" as used herein, because the RF power combiner of FIG. 2 does not have multiple beams associated with multiple terminal ports. (Of course, the system of FIG. 1 also does not meet the definition of "beamformer" as used herein.) These remarks regarding the passive nature of beamforming rectenna 380 and its implementation of a plurality of multiple, discrete, fixed beams, each associated with a respective terminal port 342, rather than performing active, continual beam steering, apply to all of the beamforming rectennas and beamforming networks described in this disclosure.

With regard to system 300, the numbers of beams 391-395, antennas 340, antenna ports 341, terminal ports 342, terminal port rectifying circuits 350, and power management systems 360 may vary from the numbers thereof illustrated in FIG. 3, and the numbers thereof illustrated in FIG. 3 are just one example and are not in any way intended to imply a preferred embodiment. Rather, those of ordinary skill in the art will understand, once having the benefit of this detailed disclosure, that there exists an infinite number of design degrees of freedom that can be used to realize the beamforming rectenna and optimize performance for specific scenarios or applications (discussed further below). The numbers of each of the aforementioned elements may be two or more, the number of antennas 340 may match the number of antenna ports 341 (in which case, a given antenna 340 connected to a given antenna port 341 may be referred to as corresponding antenna 340 and antenna port 341), and the number of terminal ports 342 may match the number of terminal port rectifying circuits 350 (in which case, a given terminal port 342 connected to a given terminal port rectifying circuit 350 may be referred to as corresponding terminal port 342 and terminal port rectifying circuit 350).

For the sake of simplicity, FIG. 3 does not illustrate a transmit beam or pattern associated with source transmitter 310. Instead, a more generalized or schematic representation is shown for electromagnetic power 320. In some embodiments, electromagnetic power 320 may be transmitted by means of a moderate to high gain antenna, which entails a narrow beam, to enhance end-to-end power transfer efficiency.

With further regard to system 300, terminal port rectifying circuits 350 rectify the received power. The rectified power is transmitted to power management system 360, which may aggregate the rectified power, filter, condition, or regulate it, and output the resultant power, e.g., to power a load or to be stored for future use.

The antenna radiation distribution patterns (391, 392, 393, 394 and 395) and the design of beamforming network 370 will now be discussed in further detail. As mentioned, antennas 340 may receive electromagnetic radiation, e.g., an RF or microwave signal 320 that has been transmitted by source transmitter 310 at a given angle of incidence 309. Angle of incidence 309 is measured relative to a fixed coordinate system or frame of reference defined by the position and orientation of antennas 340, such as Cartesian coordinate system 308, which is defined by an x-axis and a y-axis intersecting at origin O (0,0). (In order not to obscure beam center 373 (described below), which is represented by a dashed line and with which the y-axis is coincident, not all of the y-axis is illustrated as a solid line.) The antennas 340 may transfer the received radiated power 320 to beamforming network 370 via the multiple antenna ports 341. Beamforming network 370 may focus the power (e.g., direct the received electromagnetic power) to a selected one or more of the terminal ports 342 (and hence to a selected one or more of the corresponding terminal port rectifying circuits 350) in accordance with the angle of incidence 309 of the radiated power 320 relative to the array of antennas 340. The selected one or more of the terminal ports 342 may correspond to a particular one or more of the characteristic antenna radiation distribution patterns 391-395. In other words, each of the terminal ports 342 (and corresponding terminal port rectifying circuits 350) may be associated with one or more of the characteristic beams 391-395. For receive mode, the power received at a terminal port 342 is a sum of power over all 4 pi steradians weighted in each direction by the radiation pattern (or, equivalently, the one or more "beams") with which the port 342 is associated. So, a terminal port 342 "associated" with a radiation pattern (or beam) that is strong (has a large amplitude) in a specific direction will receive a signal arriving from that direction more strongly than other terminal ports 342 "associated" with respective radiation patterns that are not as strong in that direction of arrival. In transmit mode, an RF excitation at a given terminal port 342 produces radiation predominantly through the associated one or more characteristic beams 391-395. It should be noted that the beamformer 370 of FIG. 3 is not shown as being operated in a transmit mode; however, the association between a port 342 and the radiation pattern is more easily conveyed in the context of transmission, for the receiving and transmitting patterns of an antenna are identical.

It is noted that, in general, across the set of multiple possible beamforming rectenna designs, there is not a fixed mapping between a given one of the beams 391-395 of the characteristic antenna radiation distribution set and a given one of the terminal ports 342/terminal port rectifying circuits 350, or a unique mapping between the beams 391-395 and the terminal ports 342/terminal port rectifying circuits 350. A given one of the beams 391-395 may be associated with one or more of the terminal ports 342/terminal port rectifying circuits 350; or a given one of the terminal ports 342/terminal port rectifying circuits 350 may be associated with one or more of the beams 391-395. However, in some embodiments, the beamforming network 380 is designed such that each of the major beams 391-395 of the characteristic antenna radiation distribution set is associated with only one of the terminal ports 342/terminal port circuits 350. Accordingly, in some embodiments, if the angle of incidence 309 is aligned well with a single one of the characteristic antenna radiation distribution patterns, or beams, 391-395 of the beamforming rectenna 380, then the received signal power is directed predominantly to the one of the terminal port rectifying circuits 350 that corresponds to the single (associated) one of the beams 391-395. If the angle of incidence 309 of the incident signal 320 is within two or more of the beams 391-395 of the beamforming rectenna 380, then the received signal power is distributed predominantly between the two or more of terminal port rectifying circuits 350 associated with the two or more of the beams 391-395.

As noted, typically, a beamforming network such as 370 is designed to implement, in conjunction with attached antennas such as 340, a fixed set of characteristic beams such as beams 391, 392, 393, 394 and 395, whose shape and angular extent may be defined in terms of a Cartesian coordinate system 308 such as shown in FIG. 3. The set of characteristic beams or radiation distribution patterns 391, 392, 393, 394 and 395 is determined by the design of the antennas 340, the locations and orientations of the antennas 340, and the design of the beamforming network 370. Accordingly, the radiation distribution patterns 391, 392, 393, 394 and 395 result from the joint operation of the individual antenna element 340 radiation patterns and the action of the beamforming network 370; and the number of radiation distribution patterns 391, 392, 393, 394 and 395 need not match the number of antennas 340 (see e.g., FIG. 4). In the case in which the antenna element 340 patterns are the same, which, in practice, is common and accurate, the resulting radiation pattern is well known to be the product of the antenna element 340 pattern and the array pattern, the latter of which is controlled by the placement and spacing of the antenna elements 340 and the beamforming network 370. As noted, FIG. 3 is schematic, and in reality beam patterns may have additional side lobes, for example. Moreover, in at least one embodiment, the beamforming network 370 and the spacing between antennas 340 are designed such that the antenna radiation distribution pattern associated with one or more of the terminal ports 342/terminal port rectifying circuits 350 exhibits multiple main lobes or beams, such as are commonly referred to as "grating lobes" by one skilled in the art of antenna arrays. In at least one embodiment, the antennas 340 are collinear, i.e., arranged in a single line (linear array) as shown in FIG. 3, although this configuration need not (but may) be the case in other embodiments. The design of the characteristic beam set of the beamforming network 370 permits freedom in the design, e.g., with respect to the primary direction and spacing of the beams 391-395, with respect to the association of the beams 391-395 with specific ones of the paired combinations of terminal ports 342/terminal port rectifying circuits 350, and with respect to the number of beams and antenna ports.

With further regard to system 300, as also shown in FIG. 3, beam overlap can vary. For example, beam 394 is depicted as having less overlap with beam 395 as compared to the overlap between beams 394 and 393. In at least one embodiment, a beamforming network is designed such that the beams overlap sufficiently that the beamforming rectenna is capable of receiving power from a source interrogator 310 over the entire range of angles covered by the characteristic beam set. FIG. 3 may not be deemed the optimal illustration of this embodiment in view of the fact that it depicts beam 394 as not completely overlapping with beam 395. Nonetheless, to complete the example, for beamforming rectenna 380, the entire range of angles covered by the characteristic beam set would include the entire span from the beam center (beam peak) 371 of beam 391 to the beam center 375 of beam 395, through all the beams between beams 391 and 395, in addition to the spans from the beam centers of beams 391 and 395 to the respective limiting angles on the outside of beams 391 and 395, where "limiting angle" is defined as the angle at which the minimum antenna gain is obtained that permits the transfer of a specified level of power, or the transfer of power at a specified efficiency, between the source transmitter and the beamforming rectenna. If the respective limiting angles on the outside of beams 391 and 395 corresponded respectively to the left side line defining beam 391 and the right side line defining beam 395 (as shown in FIG. 3), then this entire span would be the entire angular span from the left side line defining beam 391 to the right side line defining beam 395, encompassing the angular extent of all the beams 391-395 collectively. (The term "limiting angle" need not be restricted in use to beams at the extremes of a set of beams, but may be applied to other beams, for example, in the case of beams that do not sufficiently overlap to provide for continuous coverage.) The "limiting angle" is dependent upon several parameters of the link between the source transmitter 310 and the rectenna 380, including but not limited to the transmit power of the source transmitter 310, the antenna gain of the source transmitter 310, and the propagation environment surrounding the source transmitter and the rectenna 380. In one embodiment, when an incident signal arrives at an angle at which two beams intersect within (inside) the limiting angle of both beams, the terminal ports 342 associated with both beams may both receive the incoming power. In FIG. 3, the lines designated as 372, 373 and 374 indicate the beam centers of beams 392, 393 and 394, respectively.

There are a number of types of beamforming networks that could be used to implement a beamforming network 370 for application in a beamforming rectenna 380 as described herein. For example, in at least one embodiment, the beamforming network 370 could be a microwave lens. The design of the microwave lens could be any of a number of well-known microwave lens designs. For example, in at least one embodiment the microwave lens could be a Rotman lens (the outline of which is shown schematically by the element representing beamforming network 370 in FIG. 3), as described, for example, in "Wide Angle Microwave Lens for Line Source Applications" by W. Rotman and R. Turner (IEEE Transactions on Antennas and Propagation, vol. 11, issue 6, 1963, pp. 623-632) or in *Phased Array Antennas* by A. K. Bhattacharyya (Wiley-Interscience, ISBN-13: 978-0-471-72757-6, 2006, pp. 379-415). In another embodiment, the beamforming network may comprise any of the microwave lens design derivatives of the Rotman lens, as described, for example, in the aforementioned *Phased Array Antennas* (pp. 379-415), in "Procedure for correct refocusing of the Rotman lens according to Snell's law" by D. R. Gagnon (IEEE Transactions on Antennas and Propagation, vol. 37, March 1989, pp. 390-392), or in "Comparison of the Performance of the Rotman Type Lenses Obtained by Different Design Approaches" by P. K. Singhal and R. D. Gupta (TENCON 99, Proceedings of the IEEE Region 10 Conference, vol. 1, 1999, pp. 738-741). In at least one embodiment, the microwave lens could be a lens following design procedures outlined in the aforementioned *Phased Array Antennas* (pp. 379-415) or the aforementioned "Procedure for correct refocusing of the Rotman lens according to Snell's law" (pp. 390-392). In at least one embodiment, the microwave lens could be a derivative of the Rotman lens such that the antenna ports and terminal ports are interspersed around a circular region to create a beamforming network capable of providing coverage over 360 degrees, as described in the aforementioned "Comparison of the Performance of the Rotman Type Lenses Obtained by Different Design Approaches" (pp. 738-741). In at least one embodiment, the microwave lens could be a Luneberg lens, or a derivative thereof, as described in "Fan-Beam Millimeter-Wave Antenna Design Based on the Cylindrical Luneberg Lens" by X. Wu and J. Lauren (IEEE Transactions on Antennas and Propagation, vol. 55, no. 8, August 2007, pp. 2147-2156). In at least one embodiment, the beamforming network could be formed from power dividers/combiners, waveguides, and phase shifters, or the beamforming network could be a derivative of such beamforming network. In at least one embodiment, the beamforming network could be formed from hybrid couplers, waveguides, and phase shifters, or the beamforming network could be a derivative of such a beamforming network. In at least one embodiment, the beamforming network could be a Butler matrix, as described in the aforementioned *Phased Array Antennas* (pp. 379-415), or a derivative thereof. In at least one embodiment, the beamforming network could be a Blass matrix, as described in the aforementioned *Phased Array Antennas* (pp. 379-415), or a derivative thereof. In at least one embodiment, the beamforming network could be a Ghent lens, or a derivative thereof. As noted, the beamforming networks discussed here are all passive devices, i.e., devices that do not employ active circuitry or other active elements but rather comprise only passive elements. All of the documents cited in this paragraph are hereby incorporated herein by reference.

In a general sense, a beamforming network may be understood to be a structure or passive device that collects input from a collection or array of M antenna elements 340. For a beamformer with N terminal ports, the beamformer applies N different weighting functions to the M signals, in which each weighting function comprises a magnitude and phase weight for each of the M signals. Any one terminal port provides a summation of the M signals with each of the M signals weighted according to the 1 of N weighting functions assigned to that particular port. So there would be a total of M×N×2 weights associated with a beamformer. Furthermore, the weighting functions may in general be a function of frequency. The weights are not constrained to be unique in any sense. For example, it is commonly a design goal to have all amplitude (magnitude) weights be equal. Various methods can be used to realize the weighting schemes, such as a Butler matrix or Rotman lens The weighting function associated with a terminal port, in terms of magnitude and phase, in conjunction with the placement and spacing of the antenna elements and the antenna patterns, give rise to the characteristics of the associated radiation pattern, such as, but not limited to, the number of beams and the direction of the one or more beams. In view of the above description, it will be understood that in embodiments disclosed herein, where the electromagnetic power is received in a given direction or at a given angle of incidence relative to the plurality of antennas, the received electromagnetic power is distributed by the beamforming network to each of the plurality of terminal ports in proportion to the amplitude, in the given direction or at the given angle of incidence, of the radiation distribution pattern associated with the respective terminal port.

The selection of the beamforming network might impose certain constraints. For example, a Butler matrix is more easily implemented if the number of antenna ports is 2 to the power m, where m is a positive integer. The Butler matrix can also be designed such that the beams are orthogonal. The exemplary embodiment shown in FIG. 3 is one of many possible beamforming rectenna implementations, and that certain selections of beamforming networks might impose constraints that might not be consistent with the operation or number or placement of beams and ports as shown in FIG. 3. For example, beamforming networks created as a Butler matrix are readily implemented with an even number of antenna ports and terminal ports, although other configurations are possible.

Figure 4:
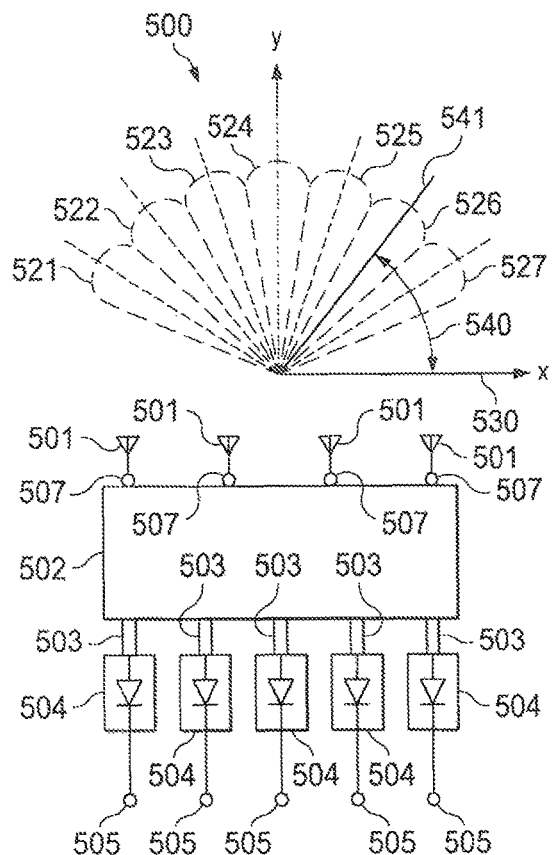
FIG. 4 is a schematic diagram, in accordance with one or more embodiments described herein, of a beamforming rectenna.

FIG. 4 illustrates schematically a beamforming rectenna (system) 500. Note that FIG. 4 omits a source transmitter and a power management circuit/system, which were included in each of systems 100, 200 and 300. Beamforming rectenna (system) 500 includes a plurality (array) of antennas 501, a plurality of antenna ports 507, beamforming network 502, a plurality of terminal ports 503, a plurality of terminal port rectifying circuits 504, and a plurality of rectifying circuit output terminals 505. As depicted, each antenna 501 is connected to a respective antenna port 507, each terminal port 503 is connected to a respective terminal port rectifying circuit 504, and each terminal port rectifying circuit 504 is connected to a respective rectifying circuit output terminal 505.

Beamforming rectenna (system) 500 has characteristic radiation pattern major beams 521, 522, 523, 524, 525, 526, and 527; each major beam peak (beam center) is indicated by a peak line at an angle relative to a Cartesian coordinate x-axis 530, such as peak line 541 and angle 540 for beam 526 (for simplicity of the illustration, the peak lines of the other beams 521, 522, 523, 524, 525 and 527 are not designated by a reference numeral, and the angles for the other beams 521, 522, 523, 524, 525 and 527 are not shown). (Similarly to FIG. 3, in order not to the obscure the beam center of beam 524, which is represented by a dashed line and with which the y-axis is coincident, not all of the y-axis is illustrated as a solid line.) The description given above of beamforming rectenna 380 (functionality, operation, etc.) applies generally to beamforming rectenna 500, unless indicated to the contrary. In short, antennas 501 receive electromagnetic radiation and transfer electromagnetic power to antenna ports 507. Beamforming network 502 directs a predominance of the power to a subset of the terminal ports 503. In one embodiment, the subset of terminal ports 503 receiving the predominance of power is a substantially smaller set than the entire set of terminal ports 503. In another exemplary set of embodiments, each of the major beams 521, 522, 523, 524, 525, 526, and 527 is associated with a single terminal port 503, in which case the number of characteristic radiation patterns 521-527 matches the number of terminal ports 503, although this exemplary set of embodiments is not illustrated in FIG. 4. A terminal port rectifying circuit 504 receives from terminal port 503 the power that has been directed to terminal port 503 from the plurality of antennas 501 by the beamforming network 502. The rectified signal is provided at a rectifying circuit output terminal 505 and is made available for filtering, conditioning, regulation, or power absorption as required by a specific application.

As before, beamforming rectenna 500 is but one example, and a wide variety of different numbers of major beams, antennas and antenna ports, and terminal port rectifying circuits and terminal ports are possible.

Figure 5:
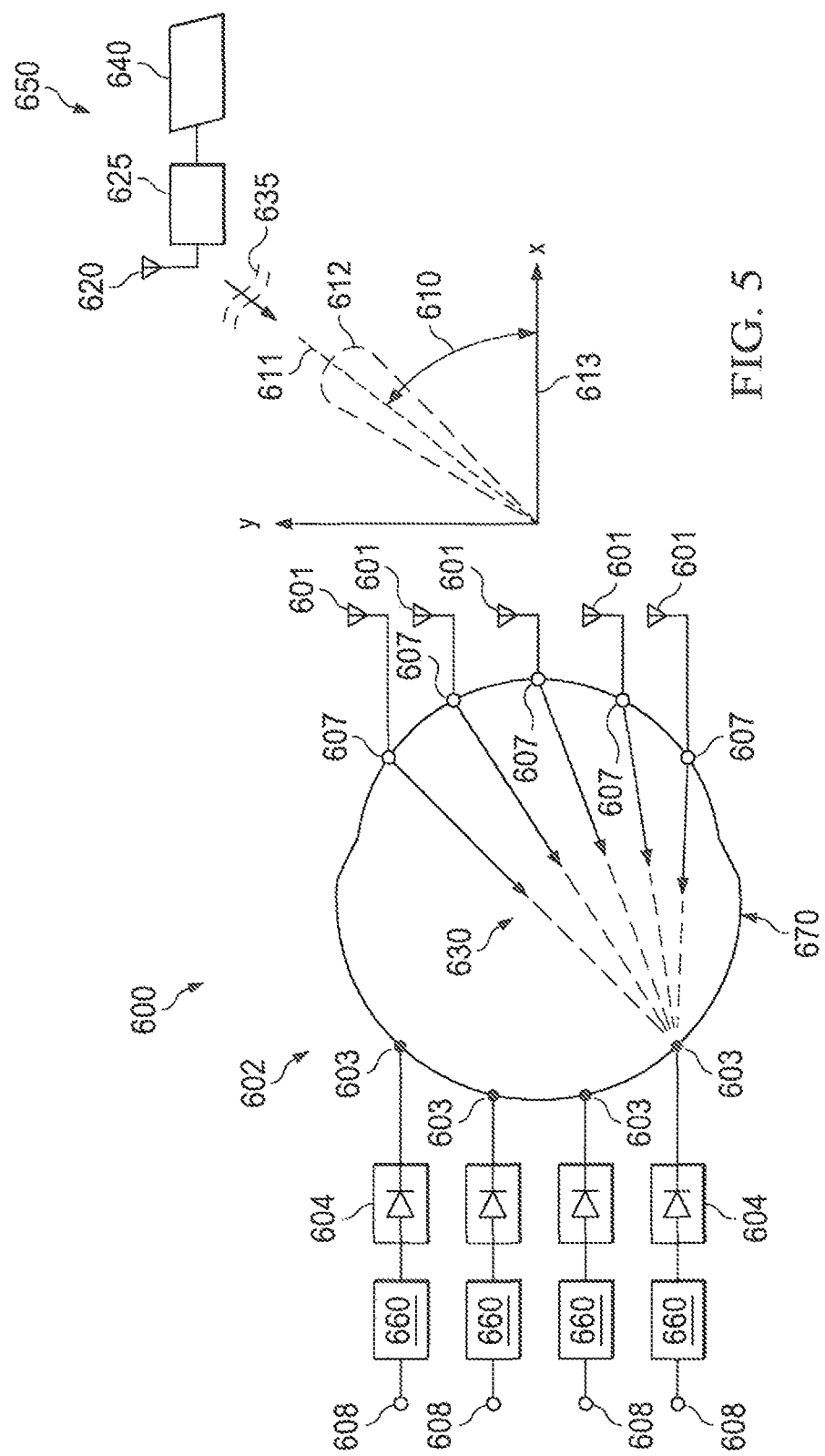
FIG. 5 is a schematic diagram, in accordance with one or more embodiments described herein, of a WPT system, showing transmission of electromagnetic radiation from a source to a beamforming rectenna.

FIG. 5 illustrates a WPT system 600, including a source transmitter 650, a beamforming rectenna 602, and a power management circuit or system 660. While beamforming network 670 and the numbers of the various illustrated elements (antennas 601, ports 607, 603, rectifying circuits 604) may differ from their counterparts in FIGS. 3 and 4, the arrangement of elements, e.g., the connections between different types of elements (e.g., antennas 601 are connected to antenna ports 607, etc.) of FIG. 5 are generally the same as that of WPT system 300 of FIG. 3 and beamforming rectenna 500 of FIG. 4, unless indicated to the contrary. Similarly, the functionality, operation, etc. described above of WPT system 300 of FIG. 3 and beamforming rectenna 500 of FIG. 4 apply generally to WPT system 600, unless indicated to the contrary. Accordingly, where the arrangement and operation of system 600 are the same as those of system 300 and beamforming rectenna 500, not all the details thereof will be repeated for system 600, but rather summary information will be included below.

Beamforming rectenna 602 receives electromagnetic power 635 radiated by a source transmitter 650. Source transmitter 650 comprises a power source 640, a transmitter system 625, and a transmitter antenna 620. Electromagnetic radiation 635 is transmitted from source transmitter 650 at an angle of incidence 610 relative to antennas 601. The radiated power 635 is received by the plurality of antennas 601, whence it is transferred to the corresponding antenna ports 607 of beamforming network 670. Beamforming network 670 directs a preponderance of the received power to a subset of the terminal ports 603 of beamforming network 670. The subset of terminal ports 603 receiving the preponderance of power are those for which the associated radiation pattern peak aligns most closely with the angle of incidence 610. Angle of incidence 610 corresponds to peak 611 of beam 612 of beamforming rectenna 602. Accordingly, the terminal port associated with beam 612 receives the preponderance of electromagnetic radiation compared to that received by other characteristic beams (not shown) of beamforming rectenna 602. (While beamforming rectenna 602 has multiple characteristic beams, for simplicity of the illustration only one beam 612 is shown in FIG. 5.) For the example depicted in FIG. 5, the preponderance of power is directed to the particular beamforming network terminal port 603 shown at the bottom in the figure, as that terminal port 603 is associated with beam 612.

While beam 612 is represented as being only in two dimensions, in fact antenna radiation patterns are three dimensional in three dimensional space. The beamwidth of beam 612, in the dimension orthogonal to the plane in which the beamwidth is compressed due to the cumulative action of the plurality of antennas 601 (i.e., in the dimension orthogonal to the plane of the page of FIG. 5), is typically the same as that beamwidth associated with each of the plurality of antenna elements 601, assuming each of the antenna elements 601 is essentially the same.

Each terminal port rectifying circuit 604 receiving sufficient power to permit rectification rectifies the received RF power to produce rectified power, and the rectified power is in turn coupled to a corresponding power management circuit 660. Each power management circuit 660 receiving rectified power from its corresponding terminal port rectifying circuit 604 performs processing of the rectified power and provides the processed power as an output 608. The processing of the rectified power may include filtering, conditioning, reporting, and/or regulation of the rectified power. Again, although each of the outputs 608 is shown as a single port in FIG. 5, the output of each power management circuit 660 may include at least two signal or electrical power paths.

In one embodiment, reporting by power management circuit 660 comprises a signal that indicates whether the available output power is at the regulated voltage within a specified tolerance. Rectified power typically must be filtered, conditioned, and/or regulated to be usable for specific applications. In an exemplary set of embodiments, power management circuits 660 receive sufficient rectified power from the terminal port rectifying circuits 604 to power the power management circuit 660, thus allowing power management circuit 660 to perform processing of the rectified power, including but not limited to filtering, conditioning, regulation, and reporting. In one set of embodiments, the power management circuit 660 is a highly integrated dc-dc converter intended for energy harvesting, such as the dc-dc converter sold by Linear Technology as the product LTC 3108, combined with peripheral components required for this product (LTC 3108), such as, but not limited to, capacitors, transformers, resistors, capacitors, and inductors.

Figure 6:
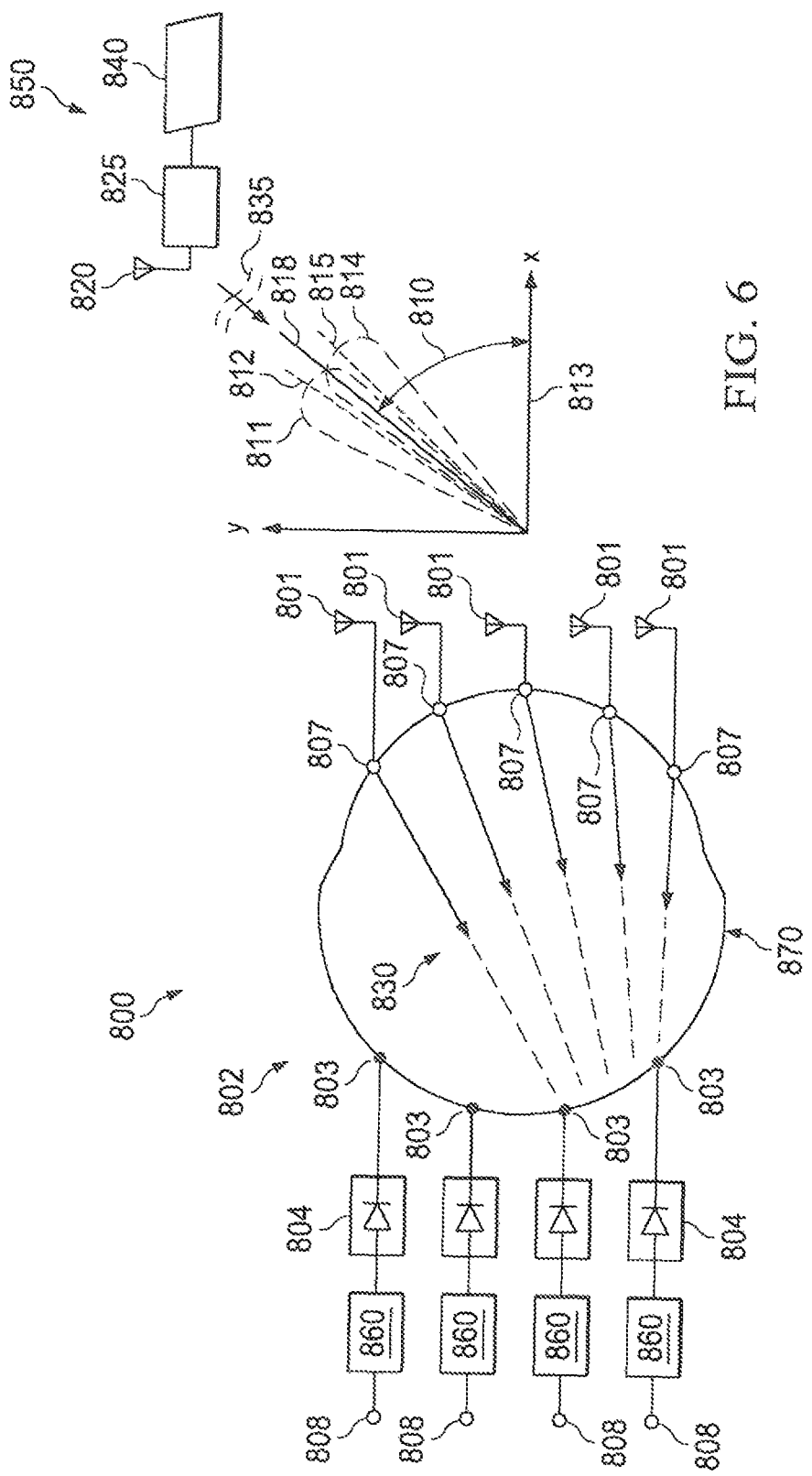
FIG. 6 is a schematic diagram, in accordance with one or more embodiments described herein, of a WPT system, showing transmission of electromagnetic radiation from a source to a beamforming rectenna in which the received power is distributed to more than one terminal port.

FIG. 6 illustrates a WPT system 800 according to some embodiments. System 800 and the embodiments illustrated in FIG. 6 are in many respects similar to system 600 and the embodiments illustrated in FIG. 5. Accordingly, the following description of system 800 and the embodiments shown in FIG. 6 will focus primarily on aspects that differ from system 600 and the embodiments of FIG. 5. Aspects of system 800 and embodiments of FIG. 6 not explicitly described herein may be presumed to correspond to their counterparts in system 600 and FIG. 5, unless indicated or implied to the contrary by the description herein.

As described above with respect to FIG. 5, beamforming network 670 directs the aggregate of power received by all antennas 601 to a single terminal port 603. However, in other embodiments the power received in a beamforming network is often directed to more than one terminal port, due in part to limitations of beamforming networks, to secondary lobes or grating lobes, and to overlap in beam patterns which are used to establish continuity in coverage across an entire angular span through which the beamforming rectenna can efficiently receive and rectify power from a source transmitter. Such distribution of power (i.e., to more than one terminal port) is illustrated in the embodiment of FIG. 6, wherein the aggregate received power is distributed by the beamforming network 870 to a plurality of the terminal ports 803 thereof, specifically the lower two terminal ports 803 as illustrated in FIG. 6. In contrast to the scenario illustrated in FIG. 5, wherein the preponderance of power 635 radiated by source transmitter 650 is received by only one beam 612 of a plurality of beams (not shown) characterizing beamforming rectenna 602, the example in FIG. 6 illustrates that the power from the electromagnetic radiation 835 radiated by source transmitter 850 is received by two (overlapping) beams 811 and 814, having beam peaks identified by lines 812 and 815, respectively, owing to the incidence angle 810 of the electromagnetic radiation 835, corresponding to line 818, at which radiation patterns 811 and 814 are both substantially high in gain. Thus, in FIG. 6, the beamforming network 870 distributes the aggregate received radiation over a larger subset of terminal ports compared to the higher focusing of power illustrated in FIG. 5. The arrows 830 in FIG. 6 (like the arrows 630 in FIG. 5) are intended to illustrate the directing of power aggregated from all of the antennas 801 (or 601), rather than power from a specific antenna. If the RF power directed to the lower two terminal ports 803 in FIG. 6 is sufficiently high to be rectified by terminal port rectifying circuits 804, the lower two rectifying circuits 804 in FIG. 6 will provide rectified power signals to the corresponding power management circuits 860, and these power management circuits 860 will provide processed DC power at their corresponding output ports 808. If characteristics of the WPT link between the source transmitter 850 and the beamforming rectenna 802 are sufficiently favorable (for example, the power 835 transmitted by source transmitter 850 presents a suitably high power density to beamforming rectenna 802), then one or more of the non-preferred (i.e., non-power directed) terminal port rectifying circuits 804, in addition to the two "preferred" (i.e., power directed) terminal port rectifying circuits 804 (i.e., the lower two terminal port rectifying circuits 804 in FIG. 6), may receive sufficient RF power to rectify and may provide corresponding power management circuits 860 with rectified power signals. The corresponding power management circuits 860 would in turn provide processed DC power to the corresponding output ports 808. Elements 820, 825, and 840 in FIG. 6 are analogous to elements 620, 625, and 640 in FIG. 5.

FIG. 7 is a schematic illustration of a Rotman lens beamforming network that, as mentioned, may be used as a beamforming network in one or more embodiments disclosed herein. Specifically, FIG. 7 is a diagram of the outline 902 of the conductive area on the top side of a Rotman lens beamforming network. The interior structure 903 of outline 902 comprises a highly conductive, thin metal layer that would form the top layer of a parallel plate waveguide type of Rotman lens, and this top layer would reside over a lower conductive layer, or ground plane, with an intervening insulating, or dielectric layer (not shown) between the two conductive layers. Along one side (upper side in FIG. 7) of the outline 902, a plurality of tapering portions are formed that extend from the interior region or central portion of outline 902 to interface with antenna ports 901 of the parallel plate body of the Rotman lens structure 903. Delay lines (not shown) may reside between the antenna ports 901 and the antennas (also not shown specifically in FIG. 7 but represented and described generally in the prior drawings of FIGS. 3-6) to achieve the desired beamforming according to theory of Rotman lenses. Along the opposing side (lower side in FIG. 7) of structure 903, a plurality of tapering output ports extend from the interior region or central portion to terminal ports 913, which interface with the terminal port rectifying circuits (not shown). Ports to the left and right sides of the interior region or central portion shown in FIG. 7, often referred to as "dummy" or "absorbing" ports 910, are in one embodiment terminated with loads matched to the port impedance to prevent reflections from them, which reflections may interfere with power traveling to or from antenna ports 901 or terminal ports 913. In a set of embodiments, the dummy ports are connected to terminal port rectifying circuits, which are in turn connected to power management circuits (not shown) so that power coupled to these ports may be rectified and supplied as DC power by the power management circuits.

FIG. 8 is a schematic illustration of a beamforming rectenna (system) wherein the beamforming network is a Butler matrix, in accordance with at least one embodiment. As mentioned above, a Butler matrix is described in more detail in the publication *Phased Array Antennas* by A. K. Bhattacharyya (pp. 379-415). As shown in FIG. 8, beamforming rectenna 700 includes a plurality of antennas 761, 762, 763 and 764, a Butler matrix beamforming network 720, and a plurality of terminal port rectifying circuits 751. Butler matrix beamforming network 720 includes, inter alia, a plurality of antenna ports 702 and a plurality of terminal ports 723, 724, 725 and 726. As with previously described embodiments, each of antennas 761, 762, 763 and 764 is connected to a corresponding respective one of antenna ports 702, and each one of terminal ports 723, 724, 725 and 726 is connected to a corresponding respective terminal port rectifying circuit 751. Each terminal port rectifying circuit 751 is connected to a respective power management circuit 760, and each power management circuit 760 is connected to one or more output terminals represented by port 706 (each element 706 represents one or more output terminals). Technically speaking, power management circuits 760 and their output terminals 706 may be deemed not to be part of beamforming rectenna 700.

In some embodiments, as further illustrated in FIG. 8, the Butler matrix beamforming network 720 includes first hybrid couplers 705 (shown toward the top in FIG. 8) connected to antenna ports 702 on one side and connected to phase shifters 710 and 711 on the other side, and second hybrid couplers 705 (shown toward the bottom in FIG. 8) connected to phase shifters 710 and 711 on one side and to terminal ports 723-726 on the other side. In addition, the first hybrid couplers 705 also connect directly to the second hybrid couplers 705, but the first hybrid coupler 705 shown at upper left connects to the second hybrid coupler 705 shown at lower right, and the first hybrid coupler 705 shown at upper right connects to the second hybrid coupler 705 shown at lower left. The first hybrid couplers serve the function of power division for incoming signals (signals received by the beamforming rectenna 700) while the second hybrid couplers serve the function of power combining for incoming signals. The phase shifters 710 and 711 serve the function of path length adjustment for beam steering. All of the hybrid couplers perform delay functions in addition to power combining and dividing. The above-mentioned components of rectenna 700 are interconnected, in the manner illustrated in FIG. 8, by RF transmission lines or waveguides, such as, for example, by microstrip line or stripline. Crossovers 712 indicate electrical connections that cross. In some embodiments, these paths cross without established electrical contact. In other embodiments, these paths cross using microstrip or stripline cross-overs, which are formed in a single plane. The numbers of antennas, antenna ports, terminal port circuits, terminal ports, hybrid couplers, and phase shifters may vary from what is illustrated in FIG. 8.

With continued reference to FIG. 8, in some embodiments the hybrid couplers 705 are branchline hybrid couplers, with the following characteristics. With reference to the hybrid coupler 705 shown at lower left quadrant of beamforming network 720 in FIG. 8, such a branchline hybrid coupler 705 has a first input port 730, a second input port 731, a first output port 732, and a second output port 733. The first input port 730 couples power equally to the first and second output ports 732 and 733, and the phase of a continuous wave signal at the second output port 733 lags the phase of that at the first output port 732 by 90 degrees. Further, the second input port 731 is theoretically isolated from the first input port 730 such that no power theoretically reaches the second input port 731 from the first input port 730 except that portion which reflects from the first output port 732 or the second output port 733 and returns to the second input port 731. Assuming the other three hybrid couplers 705 shown in FIG. 8 are similarly constructed with the lower left side port representing the first input port, the lower right side port representing the second input port, the upper left side port representing the first output port, and the upper right side port representing the second output port, and further assuming that phase shifters 710 and 711 each represent a 45 degree phase delay at the center frequency of operation, then the signal phase progression at the center frequency of operation and normalized to 0 degrees at antenna 761, for an input source at the place of terminal port 723, in the absence of terminal port circuits 751 and power management circuits 760, would be 0 degrees at antenna 761, −45 degrees at antenna 762, −90 degrees at antenna 763, and −135 degrees at antenna 764. The phase at antenna 761 is considered to be the reference phase and hence is arbitrarily assigned 0 degrees, such designation not affecting the steering of the resulting beam, which is dependent on the phase progression across the antennas 761-764 and not any absolute phase value. Such a phase progression would produce a steered beam, the angle of the steered beam being dependent upon the frequency of operation and the spacing between antennas 761-764. Considering the same example with the source at the place of terminal port circuit 724 instead of 723, again in the absence of terminal port circuits 751 and power management circuits 760, the resulting phase progression across the antennas 761-764 from left (antenna 761) to right (antenna 764) would be in increments of +135 degrees. For the case in which the source is located at the place of terminal port circuit 725, again in the absence of terminal port circuits 751 and power management circuits 760, the phase progression would be in increments of −135 degrees. For the case in which the source is located at the place of terminal port circuit 726, and once again in the absence of terminal port circuits 751 and power management circuits 760, the phase progression would be in increments of +45 degrees. The angle theta to which the beam is steered is given by the equation of $\sin(\theta) = \psi/(k \cdot d)$, where d is the linear separation space between the apparent or effective phase centers of adjacent antennas, psi is the phase progression across the antennas 761-764, $k = \omega/c$, omega is the radian frequency, and c is the speed of light. Because the beamforming network 720 is a reciprocal device, the receive beam associated with each port 723, 724, 725, and 726 is equivalent to the transmit beam. Hence, a −45 degree phase progression (received by the antennas 761-764 in a reverse order (as compared to the transmit phase progression) such that the phase of the signal received by antenna 764 is 0 degrees, the relative phase of the signal received by antenna 763 is −45 degrees, the relative phase of the signal received by antenna 762 is −90 degrees, and the relative phase of the signal received by antenna 761 is −135 degrees) would result in a preponderance of received power directed to terminal port 723. A +135 degree phase progression, in reverse order, from antenna 764 through antenna 761, would result in a preponderance of received power directed to terminal port 724. A −135 degree phase progression from antenna 764 through antenna 761 would result in a preponderance of received power directed to terminal port 725. A +45 degree phase progression from antenna 764 through antenna 761 would result in a preponderance of received power directed to terminal port 726. This foregoing discussion is just one example of a Butler matrix implementation, and many other implementations of the Butler matrix or of derivatives of the Butler matrix are possible and could be used in the design and development of a beamforming rectenna by a skilled artisan having benefit of this disclosure.

Figure 9:
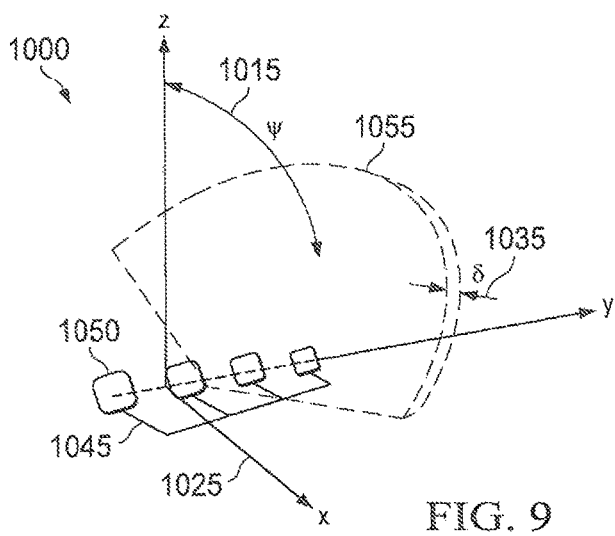
FIG. 9 is a schematic diagram, in accordance with one or more embodiments described herein, of a fixed fan-beam linear antenna array.

FIG. 9 shows a fixed fan-beam antenna 1000 comprising a linear array of antenna elements 1050 that are connected by an RF combiner circuit 1045. Antenna elements are distributed linearly along the y-axis of Cartesian coordinate system 1025. RF combiner circuit 1045 adds RF signals from each of the antenna elements 1050 and provides proper delay to each channel such that the composite radiation pattern 1055 from fixed fan-beam antenna 1000 is steered at a fixed angle ψ 1015 from the z-axis of coordinate system 1025. Although the number of antenna elements 1050 shown is four, and the RF combiner circuit 1045 shows four channels, in general the number of antenna elements and combiner channels can be increased to result in a narrower beam gap angle, δ, 1035, or reduced to result in a wider beam gap angle, δ, 1035.

Figure 10:
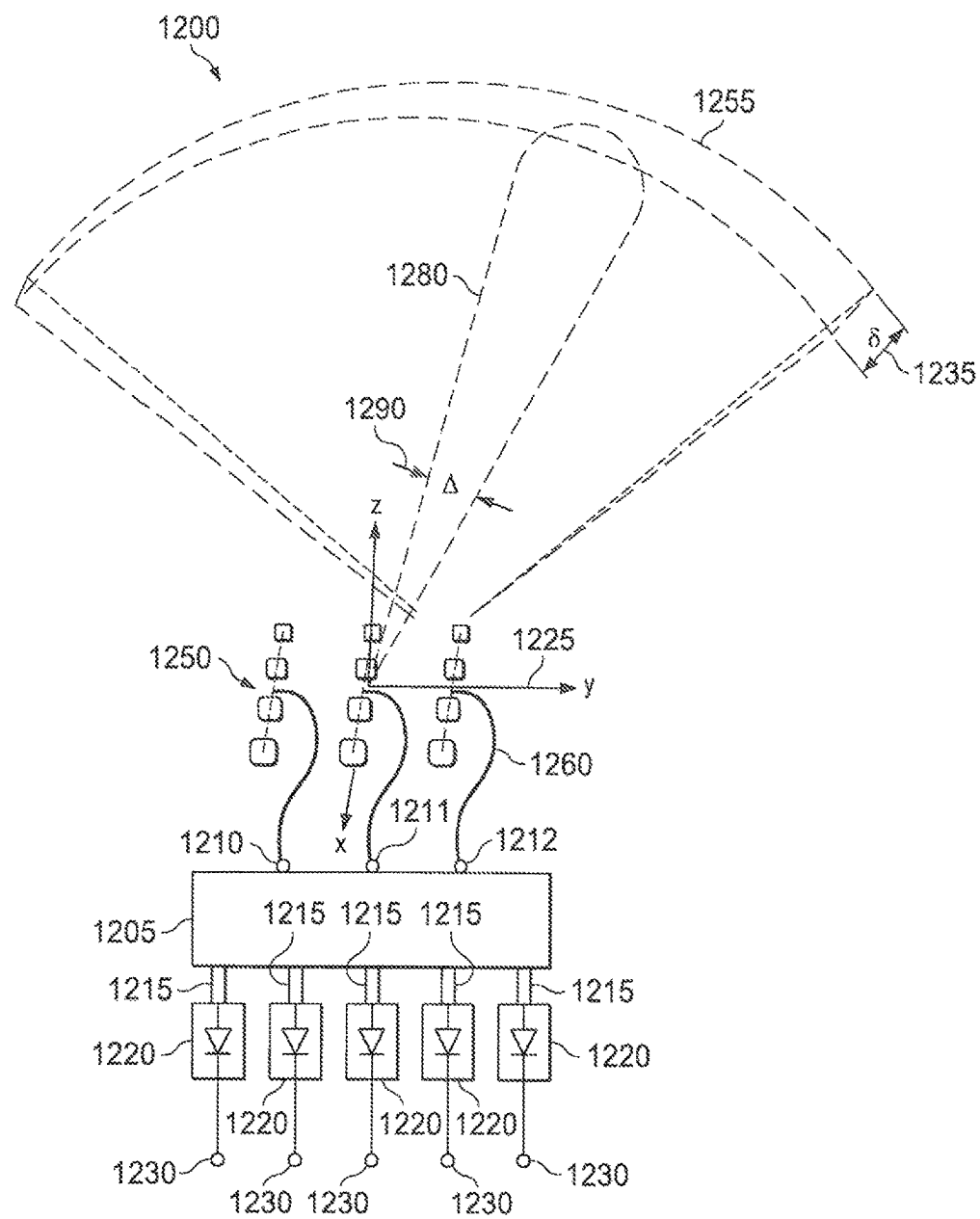
FIG. 10 is a schematic diagram, in accordance with one or more embodiments described herein, of a beamforming rectenna including a plurality of fixed fan-beam linear antenna arrays.

FIG. 10 shows a beamforming rectenna system 1200 in which each of the antennas 1250 is a fixed fan-beam antenna comprising a linear array of antenna elements (four antenna elements shown in each linear array, not individually designated by reference numerals), such as the fixed fan-beam antenna 1050 shown in FIG. 9.

While antennas 1250 may differ in kind, and various elements illustrated in FIG. 10 may differ in number, from their counterparts in other figures, the arrangement of certain elements vis à vis the beamforming network 1205, e.g., the connections between different types of elements (e.g., antennas 1250 are connected to antenna ports 1210-1212, terminal ports 1215 are connected to terminal port rectifying circuits 1220, terminal port rectifying circuits 1220 are connected to output power ports 1230) of FIG. 10 are generally the same as that of other WPT systems and beamforming rectennas disclosed herein, unless indicated to the contrary. Similarly, the functionality, operation, etc. described above of other WPT systems and beamforming rectennas apply generally to beamforming rectenna system

1200, unless indicated to the contrary. (Of course, the various specific kinds of beamforming networks, such as those described with reference to FIGS. 7, 8, 12 and 13, may but do not necessarily apply to beamforming rectenna system 1200.) Accordingly, where the arrangement and operation of beamforming rectenna system 1200 are the same as those of other WPT systems and beamforming rectennas described herein, not all the details thereof will be repeated for system 1200, but rather summary information will be included below.

Continuing with the description of beamforming rectenna system 1200, each of the antennas 1250 is aligned parallel with the x-axis of Cartesian coordinate system 1225. For each antenna 1250, the individual antenna elements of the linear array comprising the antenna 1250 lie in the x-y plane. Associated with each fixed fan-beam antenna 1250 is a respective RF combiner circuit (not shown), such as RF combiner circuit 1045 shown in FIG. 9. Each RF combiner circuit is designed to steer the associated fixed beam fan-shaped radiation pattern 1255 at an angle ψ measured from the z-axis in the x-z plane (pattern 1255 is analogous to pattern 1055 in FIG. 9, and angle ψ is analogous to angle ψ in FIG. 9; for simplicity, a pattern 1255 is shown for only one of the three antennas 1250 in FIG. 10, and angle ψ is not shown in FIG. 10). Each fixed fan-shaped beam antenna 1250 is connected via a respective connection 1260 to beamforming network 1205 at a respective one of its antenna ports 1210, 1211 and 1212. The beamforming network 1205 in conjunction with fixed fan-beam antennas 1250 produces a set of composite radiation distribution beam patterns 1280 within the fixed beam fan-shaped radiation pattern 1255 of fixed fan-beam antennas 1250. Again, for simplicity, only a single one of the plurality of composite beams 1280 for the illustrated fixed beam fan-shaped antenna radiation pattern 1255 is shown. Beam 1280 is shown with a lateral beamwidth Δ 1290 that is reduced relative to the beamwidth of the fixed beam fan-shaped radiation pattern 1255 due to the focusing produced by the input of the multiple fixed fan-beam antennas 1250 and the beamforming network 1205, wherein the term "lateral" is defined here to be orthogonal to the direction defining the fan beamwidth, δ, and also orthogonal to the radial vector (not shown) from the origin of the Cartesian system 1225 (that is, the direction of "lateral" would reside in the y-z plane for the situation shown in FIG. 10, in which the angle ψ is 0 degrees). The beamwidth of beam 1280 in the orthogonal x-z plane is not shown, but a skilled artisan with benefit of this disclosure will recognize that this particular beamwidth will be approximately the same as the beamwidth (beam gap angle) δ of the beam pattern 1255 of each of the antennas 1250 in that same plane (only a single beamwidth δ, namely, 1235, and, as mentioned, a single beam pattern 1255, are shown). In one embodiment, each composite radiation distribution beam pattern 1280 is associated with one of the terminal ports 1215 of beamforming network 1205, and each terminal port 1215 is connected to a respective terminal port rectifying circuit 1220. Each terminal port rectifying circuit 1220 provides a rectified signal to a respective output power port 1230. Beamforming network 1205, in conjunction with the plurality of fixed fan-beam antennas 1250, may create a plurality of composite beams such as beam 1280 which can be "steered" approximately within the fixed fan-beam pattern 1255 associated with a single antenna 1250, where "steered" in the context of beamforming network 1205 is intended to mean that beamforming network 1205 can be designed to orient the beam 1280 in a specified direction, but the direction of that particular characteristic beam 1280 is essentially fixed upon development of the beamforming rectenna 1200.

With continued reference to FIG. 10, in one embodiment, the beam gap angle δ 1235 is set such that it extends just wide enough to capture any angular variations of the intended source transmitters (not shown). In another embodiment, the beam gap angle δ 1235 is set such that it extends just wide enough to capture most angular variations of the intended source transmitters. Beamforming rectenna system 1200 permits increased range and/or increased power transfer through increased focusing that is due to the increased directivity of the arrays 1250 of antenna elements (as compared to single antenna elements), each array 1250 of antenna elements being connected to a respective beamforming network antenna port 1210, 1211, 1212.

Figure 11:
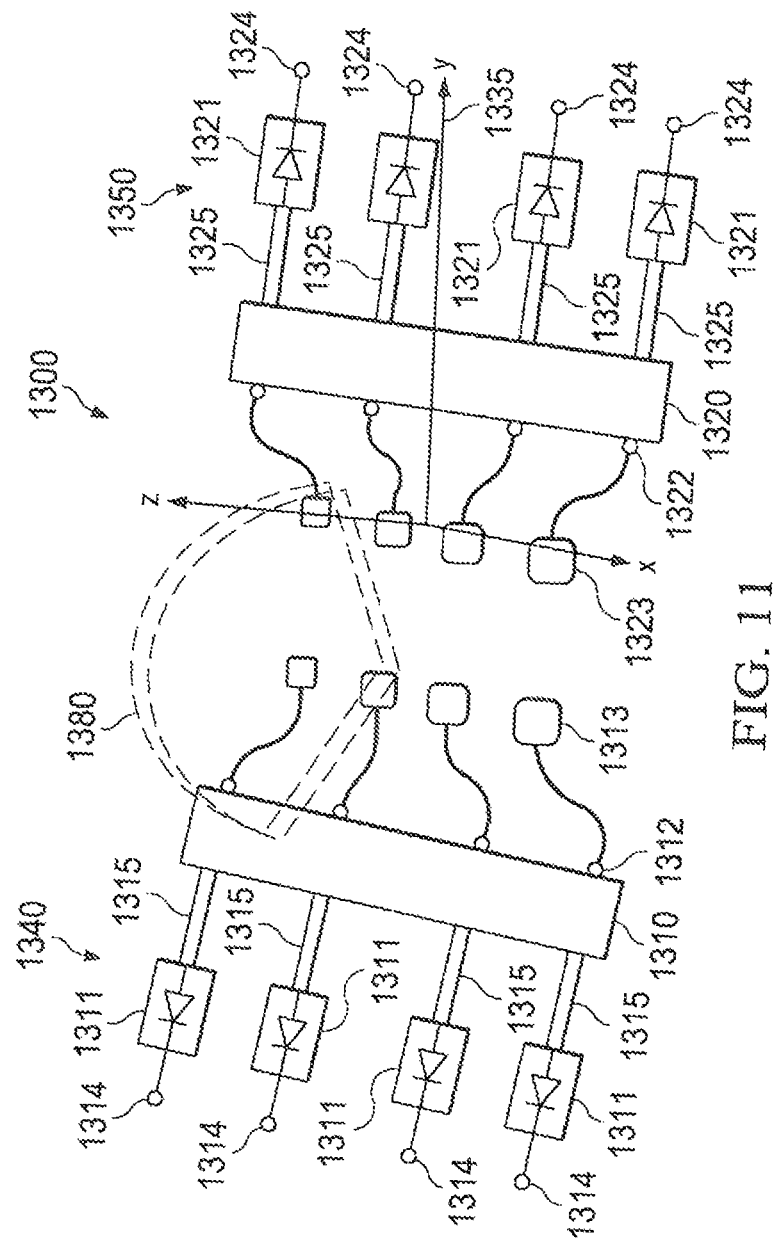
FIG. 11 is a schematic diagram, in accordance with one or more embodiments described herein, of a system comprising a plurality of beamforming rectennas.

FIG. 11 is a schematic diagram of a WPT system 1300 comprising a plurality of beamforming rectennas 1340 and 1350. System 1300 is shown relative to Cartesian coordinate system 1335. A source transmitter is not shown in FIG. 11.

Aside from the fact that system 1300 includes a plurality of beamforming rectennas 1340 and 1350, the embodiments illustrated in FIG. 11 are in many respects similar to system 1200 and the embodiments illustrated in FIG. 10. Aspects of system 1300 and embodiments of FIG. 11 not explicitly described herein may be presumed to correspond to their counterparts in system 1200 and FIG. 10, unless indicated or implied to the contrary by the description herein. In that regard, it will be noted that beamforming rectennas 1340 and 1350 may but need not be comparable to beamforming rectenna 1200 shown in FIG. 10, in which each of antennas 1250 is a fixed fan-beam antenna comprising an array of antenna elements.

Continuing with the description of WPT system 1300, each beamforming rectenna 1340 and 1350 comprises a plurality of antenna elements 1313 or 1323, respectively, a beamforming network 1310 or 1320, respectively, a plurality of terminal port rectifying circuits 1311 or 1321, respectively, and a plurality of rectifying circuit output ports 1314 or 1324, respectively. Each beamforming network 1310 or 1320 comprises a plurality of antenna ports 1312 or 1322, respectively, and a plurality of terminal ports 1315 and 1325, respectively. Each beamforming rectenna 1340 or 1350 is characterized by a set of characteristic radiation patterns, each radiation pattern being associated with one or more terminal ports 1315 or 1325, respectively. In FIG. 11, only a single characteristic radiation pattern 1380 is shown for beamforming rectenna 1340, as an example; for simplicity of illustration; the other characteristic radiation patterns characterizing beamforming rectenna 1340 are not shown. Similarly, beamforming rectenna 1350 is associated with a set of characteristic radiation patterns, although for simplicity none are shown in FIG. 11. A characteristic radiation pattern, such as that designated by reference numeral 1380, may have a narrow pattern in one plane such as a plane parallel to the x-z plane, as shown in FIG. 11, and a broad pattern in an orthogonal (lateral) plane such as a plane parallel to the y-z plane (not shown but analogous to element 1255 in FIG. 10). The beamwidth of the characteristic radiation pattern in the lateral plane (not shown but analogous to lateral beamwidth Δ 1290 in FIG. 10) will be essentially determined by the beamwidth of the individual antenna elements 1313, 1323. In one set of embodiments, each of the antenna elements 1313 lies in a line, each of the antenna elements 1323 lies in a line, and the line containing antenna elements 1313 and the line containing antenna elements 1323 are essentially parallel to one another. In at least one embodiment, the terminal port rectifying circuits 1314 and 1324 are connected to a common power management system (not shown in FIG. 11). In at least one embodiment, the terminal port rectifying circuits 1314 and 1324 are connected to separate power management systems (not shown in FIG. 11). Variations are possible in this regard. For example, each of terminal port rectifying circuits 1314 and 1324 could be connected to its own power management circuit/system, all terminal port rectifying circuits 1314 and 1324 could be connected to a single power management circuit/system, or some of terminal port rectifying circuits 1314 and 1324 could be connected to their own respective power management circuit/systems while others could be connected to a single power management circuit/system. Such variations as to whether terminal port rectifying circuits are connected each to a respective power management circuit/system (or output power port), or rather some or all terminal port rectifying circuits are connected to a single power management circuit/system (or output power port), apply generally to all embodiments disclosed herein even if not explicitly mentioned in the discussion of other embodiments, unless indicated to the contrary.

Although WPT system 1300 in FIG. 11 shows two beamforming rectennas 1340 and 1350, a WPT system may comprise more than two beamforming rectennas. In addition, a WPT system comprising a plurality of beamforming rectennas need not have the characteristics specific to system 1300, but could have the characteristics of other WPT systems/beamforming rectenna systems disclosed herein (e.g., different types of beamforming networks, different types of antennas, etc.)

Figure 12:
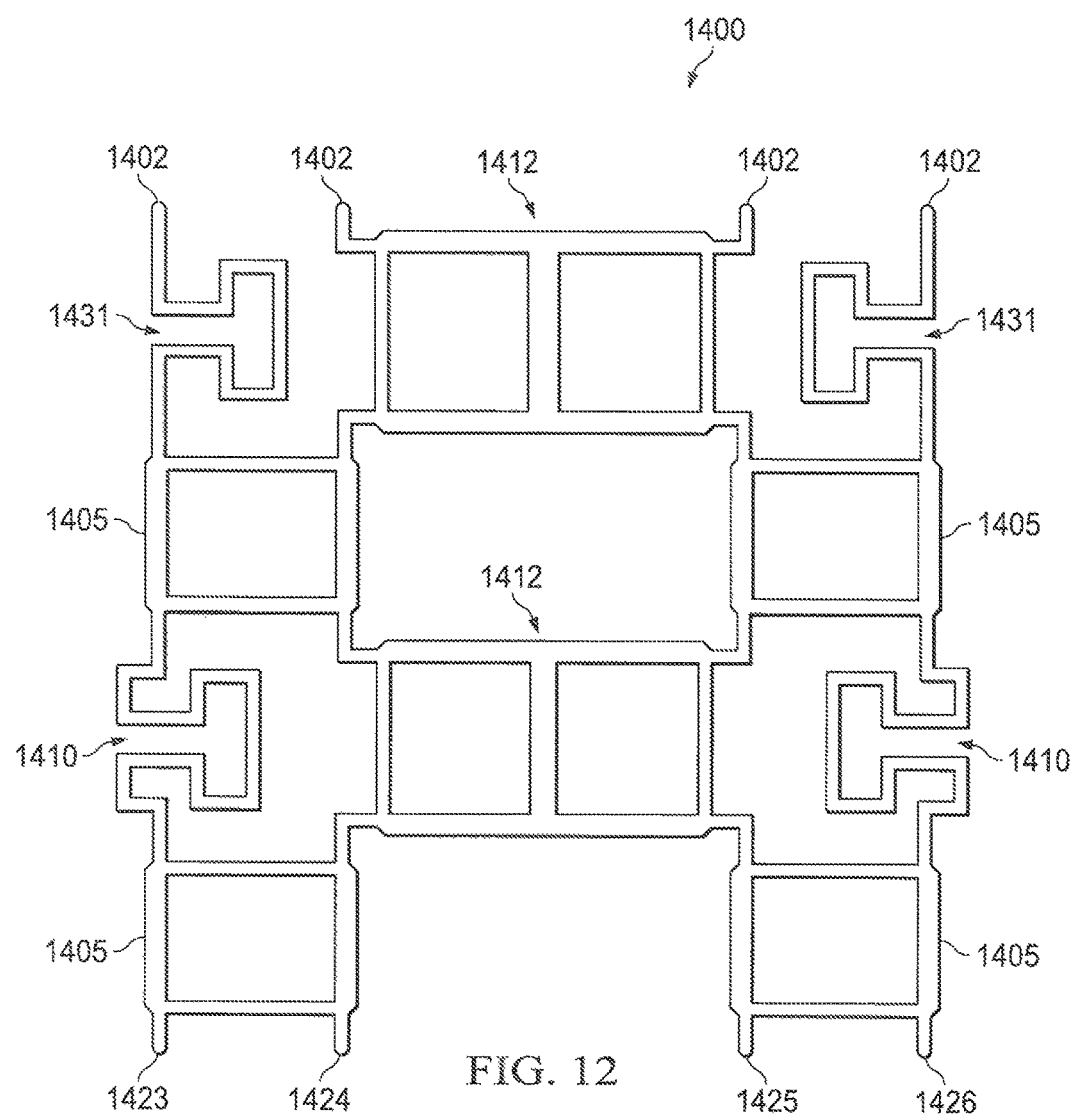
FIG. 12 is a graphical representation, in accordance with one or more embodiments described herein, of a microstrip implementation of a Butler matrix beamforming network.

FIG. 12 shows the top pattern of a microstrip implementation of a Butler matrix beamforming network 1400 designed for a WPT system operating at approximately 850-950 MHz. The microstrip Butler matrix beamforming network 1400 has four antenna ports 1402 shown across the top portion of this view and four terminal ports 1423, 1424, 1425 and 1426 shown along the bottom portion of this drawing. Hybrid couplers 1405 (four shown) provide power division and combining, as previously discussed with reference to FIG. 8. A cross-coupler 1412 (two shown) facilitates implementation by permitting single layer fabrication (i.e., no out-of-plane cross-overs are required), as taught in "Microstrip Antenna Array with Four Port Butler Matrix for Switched Beam Base Station Application," by Muhammad Mahfuzul Alam, Proceedings of 2009 12$^{th}$ International Conference on Computer and Information Technology (IC-CIT 2009), Dec. 21-23, 2009, Dhaka, Bangladesh. Meander lines 1431 compensate for phase delays associated with the cross-coupler circuit 1412 shown at the top of the figure. Meander lines 1410 each provide a phase delay of 45 degrees, as discussed previously with reference to FIG. 8, as well as an additional phase delay to compensate for adjacent cross-coupler 1412 (the lower of the two cross-coupler circuits 1412 shown in FIG. 12). Antennas, rectifier circuits, interconnect cables, and power management systems are not shown in FIG. 12. In some embodiments, the beamforming network 1400, antennas, and rectifier circuits are all printed and/or attached to one board, thereby obviating the need for RF connectors or RF cables.

Figure 13:
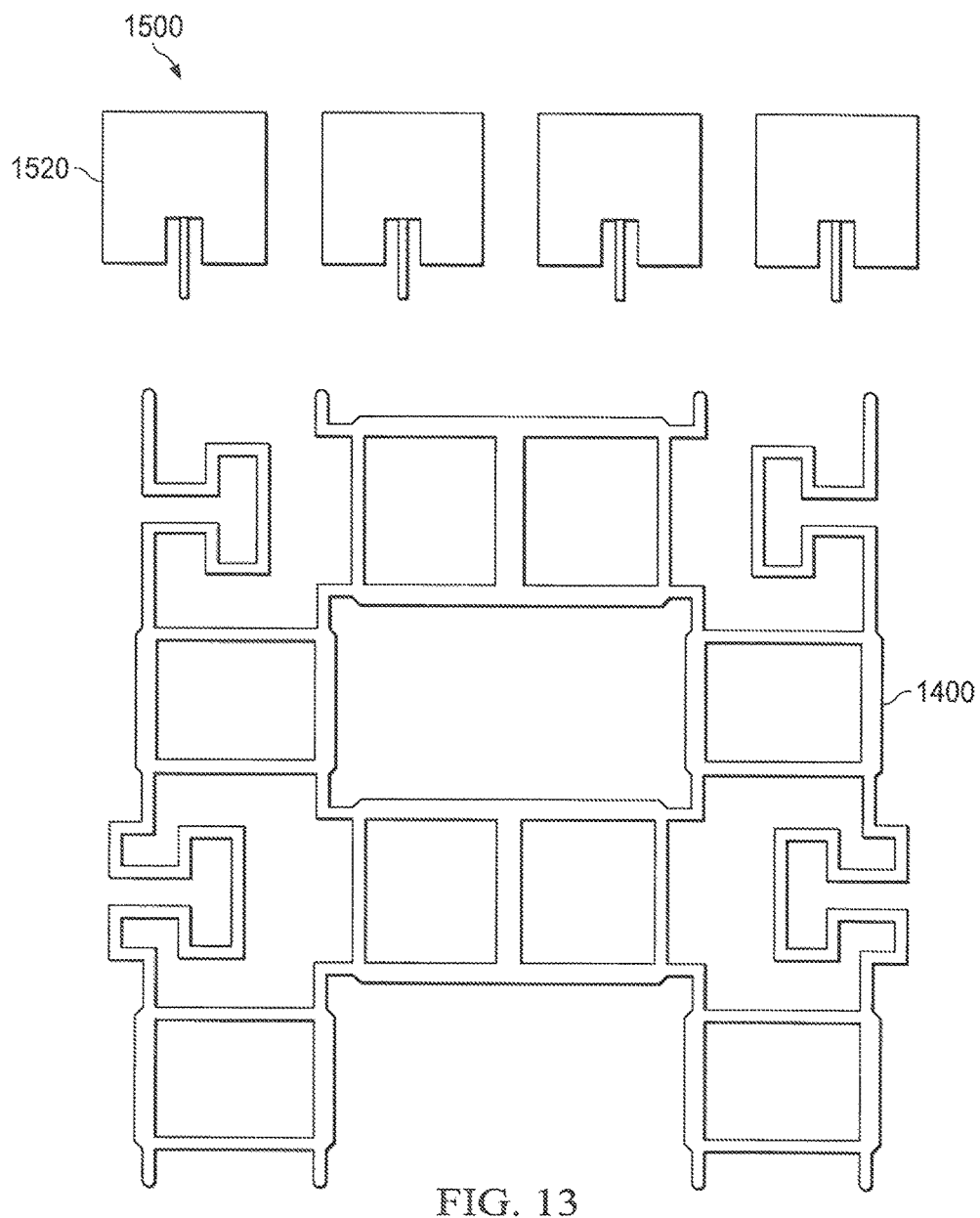
FIG. 13 is a graphical representation, in accordance with one or more embodiments described herein, of a microstrip beamforming rectenna including the microstrip Butler matrix beamforming network of FIG. 12.

FIG. 13 shows elements of the top pattern of a microstrip beamforming rectenna 1500 including the microstrip Butler matrix beamforming network 1400, described previously with respect to FIG. 12, and antenna elements 1520, shown as the top metal region pattern of microstrip patch antennas, that may be used in conjunction with beamforming network 1400. Rectification circuits, interconnecting cables, and power management systems are not shown in FIG. 13.

The structure and operation of microstrip Butler matrix beamforming network 1400 and microstrip beamforming rectenna 1400 will be further understood by one of ordinary skill in the art after having benefit of this disclosure, such as the discussion with reference to FIG. 8.

While some figures show linear arrays of antennas, non-linear arrays of antennas may also be employed. Further, in at least some embodiments, the plurality of antennas may include (a) one or more linear arrays of antennas, (b) one or more non-linear arrays of antennas, (c) one or more arrays of antennas collinear with another one or more arrays of antennas, (d) one or more arrays of antennas not collinear with another one or more arrays of antennas, or (e) one or more arrays of antennas representing any combination of the preceding types (a)-(d) of arrays of antennas.

With respect to the embodiments disclosed herein, the plurality of radiation distribution patterns characterizing a beamforming rectenna may collectively cover a continuous angular extent, whether some of the radiation distribution patterns are overlapping or not. With further respect to the embodiments disclosed herein, the power management circuits/systems may or may not be deemed part of the rectennas with which they operate. In addition, the power management functionality may vary depending on the application for which the collected power is used. The collected power may be used for RFID (radio frequency identification) sensors such as described in the aforementioned U.S. patent application Ser. No. 14/201,402.

As mentioned, the number of terminal ports and antenna elements may be less or more than indicated in the examples described herein. For example, although FIGS. 8, 12 and 13 pertain to 4-element, 4-port Butler matrix beamformers, implementations involving greater or lesser number of antenna elements and ports are possible. Such implementations may require a greater or lesser number of components, such as hybrid couplers, phase delay lines, and cross-overs, compared to the number described with respect to FIGS. 8, 12 and 13. For example, a Butler matrix beamformer with two antenna elements and two terminal ports can be created with a single hybrid coupler, in which two ports of the hybrid coupler are attached to the two antenna elements, respectively, and the opposing two ports of the hybrid coupler are the two terminal ports, respectively.

Figure 14:
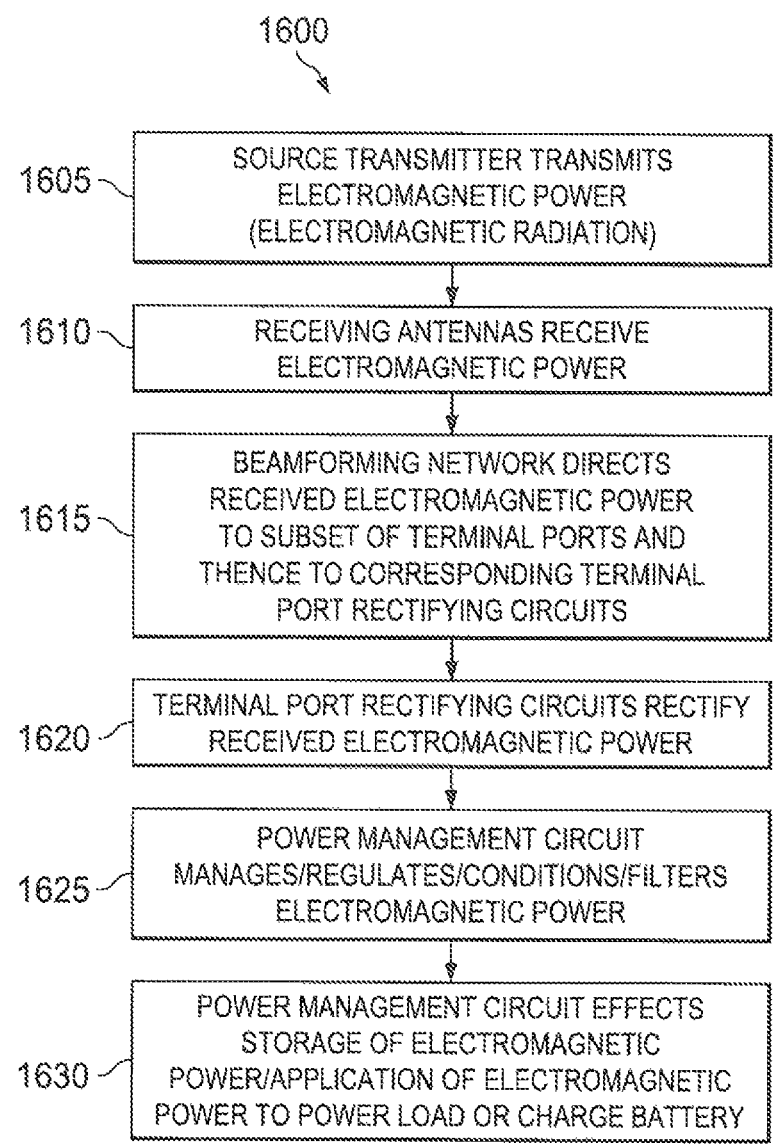
FIG. 14 is a flow chart, in accordance with one or more embodiments described herein, illustrating a WTP method that may be performed using a beamforming rectenna.

FIG. 14 is a flow chart, in accordance with one or more embodiments described herein, illustrating a WTP method 1600 that may be performed using a beamforming rectenna. The beamforming rectenna may comprise a plurality of antennas, a plurality of terminal port rectifying circuits, and a beamforming network. The beamforming network may include (a) a plurality of antenna ports connecting to the plurality of antennas, and (b) a plurality of terminal ports connecting to the plurality of terminal port rectifying circuits. The beamforming rectenna may be characterized by a plurality of radiation distribution patterns. Each of the radiation distribution patterns may be associated with one or more of the terminal ports. In some embodiments, each of the radiation distribution patterns is associated with only a single one of the terminal ports.

At step 1605, electromagnetic power (in the form of electromagnetic radiation) is transmitted by a source transmitter for reception by one or more of the antennas of the beamforming rectenna. At step 1610, the transmitted electromagnetic power, or a portion thereof, is received by one or more of the antennas. The electromagnetic power may be received by the one or more antennas via their respective element radiation distribution patterns (i.e., the radiation distribution patterns of the individual antennas, not the radiation distribution patterns of the beamforming rectenna). The received electromagnetic power may be transmitted from the one or more antennas to corresponding antenna ports of the beamforming network. At step 1615, the beamforming network directs the electromagnetic power to a subset of the terminal ports and thence toward a subset of the terminal port rectifying circuits. The subset of terminal ports to which the electromagnetic power is directed by the beamforming network may be associated with those radiation distribution patterns (of the beamforming rectenna) that exhibit a stronger response (as further described elsewhere in this disclosure) at or near the angle of incidence of the radiation that was received in step 1610. In some of the cases where the one-to-one association of radiation distribution patterns (of the beamforming rectenna) and terminal ports holds, the electromagnetic power may be received by the antennas and may accordingly be directed by the beamforming network to the respective two or more terminal ports associated with the two or more radiation distribution patterns (of the beamforming rectenna) that align with the directions from which the electromagnetic power was received. At step 1620, the subset of the terminal port rectifying circuits that received the electromagnetic power (directed thereto by the beamforming network) rectify the received electromagnetic power. At step 1625, the electromagnetic power may be filtered, conditioned, regulated, boosted, or managed. At step 1630, the electromagnetic power may be stored, used to supply power to a load, or used to charge a battery. Steps 1625 and 1630 may be performed by a power management circuit or system or in some cases (although not generally indicated heretofore) by the terminal port rectifying circuits that receive and rectify the electromagnetic power. Further details and variations of the above-described method will be understood by one of ordinary skill in the art after having benefit of the instant disclosure. Numerous such variations and details have been set forth in the description of the systems and apparatuses set forth herein prior to the description of the above-described method illustrated by the flow chart of FIG. 14.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, differently ordered or otherwise altered.

In view of the wide variety of useful permutations that may be readily derived from the exemplary embodiments described herein, this detailed description is intended to be illustrative only, and should not be taken as limiting the scope of the disclosure. What is claimed as the disclosure, therefore, are all implementations that come within the scope of the following claims, and all equivalents to such implementations. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system, comprising:
   a beamforming rectenna, the beamforming rectenna comprising:
      a plurality of antennas;
      a plurality of terminal port rectifying circuits; and
      a beamforming network, the beamforming network including (a) a plurality of antenna ports connecting to the plurality of antennas, and (b) a plurality of terminal ports connecting to the plurality of terminal port rectifying circuits,
      wherein the beamforming network is configured to direct electromagnetic power received via the plurality of antennas and the plurality of antenna ports to a respective subset of the plurality of terminal ports, based on the electromagnetic power received, wherein there are a plurality of different subsets.

2. The system of claim 1,
   wherein the electromagnetic power is received in a plurality of directions,
   wherein the beamforming rectenna is characterized by a plurality of radiation distribution patterns, each of the plurality of radiation distribution patterns being associated with one or more of the plurality of terminal ports, and each of the plurality of terminal ports being associated with one of the plurality of radiation distribution patterns,
   wherein, for each of the plurality of directions, the beamforming network is configured to direct electromagnetic power received in the respective direction to a respective subset of the plurality of terminal ports, and
   wherein the respective subset of the plurality of terminal ports is associated with a respective subset of the radiation distribution patterns, the respective subset of the radiation distribution patterns comprising a particular one or more of the radiation distribution patterns whose amplitudes in the respective direction are greater than amplitudes, in the respective direction, of other ones of the radiation distribution patterns.

3. The system of claim 1,
   wherein the electromagnetic power is received in a given direction,
   wherein the beamforming rectenna is characterized by a plurality of radiation distribution patterns, each of the plurality of radiation distribution patterns being associated with one or more of the plurality of terminal ports, and each of the plurality of terminal ports being associated with one of the plurality of radiation distribution patterns, and
   wherein the subset of the plurality of terminal ports is associated with a subset of the radiation distribution patterns, the subset of radiation distribution patterns comprising a particular one or more of the radiation distribution patterns whose amplitudes in the given direction are greater than amplitudes, in the given direction, of other ones of the radiation distribution patterns.

4. The system of claim 3, wherein the beamforming network is configured to distribute the received electromagnetic power to each of the plurality of terminal ports in proportion to an amplitude, in the given direction, of a radiation distribution pattern associated with the respective terminal port.

5. The system of claim 3, wherein each of the plurality of radiation distribution patterns is associated with only a single one of the plurality of terminal ports.

6. The system of claim 3, wherein the plurality of radiation distribution patterns collectively cover a continuous angular extent.

7. The system of claim 3, wherein the electromagnetic power directed to the subset of the plurality of terminal ports comprises a substantial portion of the electromagnetic power received by the plurality of the antennas.

8. The system of claim 1, wherein the plurality of antennas comprise (a) one or more linear arrays of antennas, (b) one or more non-linear arrays of antennas, (c) one or more arrays of antennas collinear with another one or more arrays of antennas, (d) one or more arrays of antennas not collinear with another one or more arrays of antennas, or (e) one or more arrays of antennas representing any combination of the preceding types (a)-(d) of arrays of antennas.

9. The system of claim 1, wherein at least one of the terminal port rectifying circuits comprises a half-wave rectifying circuit, a full-wave rectifying circuit, or a capacitor.

10. The system of claim 1, wherein the beamforming network comprises one of the following or a derivative thereof: a microwave lens; a Rotman lens; a Ghent lens; a Luneberg lens; a Butler matrix; a combination of transmission lines and directional couplers that form a Blass matrix; a combination of power combiners, power dividers, waveguides, and phase shifters; a combination of hybrid couplers, waveguides, and phase shifters.

11. The system of claim 1, further comprising one or more power management circuits connected to one or more of the plurality of terminal port rectifying circuits.

12. The system of claim 1, further comprising a source transmitter operable to transmit electromagnetic power for reception by one or more of the plurality of antennas, wherein the source transmitter may or may not be mobile relative to the plurality of antennas.

13. The system of claim 1, wherein the beamforming network comprises only passive elements.

14. The system of claim 1, wherein each of the plurality of antennas comprises a fixed fan-beam antenna, each fixed fan-beam antenna comprising an array of antenna elements and characterized by a fixed fan-beam pattern.

15. The system of claim 14, wherein the beamforming network in conjunction with a respective one of the plurality of antennas is configured to produce a plurality of steered radiation distribution patterns within the fixed fan-beam pattern of the respective one of the plurality of antennas, each of the steered radiation distribution patterns being fixedly oriented in a particular direction.

16. The system of claim 1, wherein the plurality of antennas comprise microstrip patch antennas, and the beamforming network comprises a microstrip implementation of a Butler matrix.

17. A system comprising:
a plurality of beamforming rectennas, each of the plurality of beamforming rectennas comprising:
a plurality of antennas;
a plurality of terminal port rectifying circuits; and
a beamforming network, the beamforming network including (a) a plurality of antenna ports connecting to the plurality of antennas and (b) a plurality of terminal ports connecting to the plurality of terminal port rectifying circuits,
wherein the beamforming network is configured to direct electromagnetic power received via the plurality of antennas and the plurality of antenna ports to a respective subset of the plurality of terminal ports, based on the electromagnetic power received, wherein there are a plurality of different subsets.

18. The system of claim 17, wherein the plurality of antennas of a first one of the plurality of beamforming rectennas comprises a first linear array of antennas, the plurality of antennas of a second one of the plurality of beamforming rectennas comprises a second linear array of antennas, and the first linear array of antennas is aligned parallel to the second linear array of antennas.

19. A method for wireless transfer of power, the method for use with a beamforming rectenna, the beamforming rectenna comprising:
a plurality of antennas;
a plurality of terminal port rectifying circuits; and
a beamforming network, the beamforming network including (a) a plurality of antenna ports connecting to the plurality of antennas, and (b) a plurality of terminal ports connecting to the plurality of terminal port rectifying circuits; and
the method comprising:
receiving electromagnetic power by one or more of the plurality of antennas and one or more of the plurality of antenna ports:
directing, by the beamforming network, at least a substantial portion of the electromagnetic power to a respective subset of the plurality of the terminal ports, based on the electromagnetic power received, and thence toward a respective subset of the plurality of the terminal port rectifying circuits, wherein there are a plurality of different subsets; and
rectifying the electromagnetic power by the subset of the plurality of terminal port rectifying circuits.

20. The method of claim 19,
wherein the electromagnetic power is received in a plurality of directions,
wherein the beamforming rectenna is characterized by a plurality of radiation distribution patterns, each of the plurality of radiation distribution patterns being associated with one or more of the plurality of terminal ports, and each of the plurality of terminal ports being associated with one of the plurality of radiation distribution patterns,
wherein, for each of the plurality of directions, the beamforming network directs at least a substantial portion of the electromagnetic power received in the respective direction to a respective subset of the plurality of terminal ports and thence toward a respective subset of the plurality of the terminal port rectifying circuits, and
wherein the respective subset of the plurality of terminal ports is associated with a respective subset of the radiation distribution patterns, the respective subset of the radiation distribution patterns comprising a particular one or more of the radiation distribution patterns whose amplitudes in the respective direction are greater than amplitudes, in the respective direction, of other ones of the radiation distribution patterns.

21. The method of claim 19, wherein the electromagnetic power is received in a given direction, wherein the beamforming rectenna is characterized by a plurality of radiation distribution patterns, each of the plurality of radiation distribution patterns being associated with one or more of the plurality of terminal ports, and each of the plurality of terminal ports being associated with one of the plurality of radiation distribution patterns, and wherein the subset of the plurality of terminal ports is associated with a subset of the radiation distribution patterns, the subset of radiation distribution patterns comprising a particular one or more of the radiation distribution patterns whose amplitudes in the given direction are greater than amplitudes, in the given direction, of other ones of the radiation distribution patterns.

22. The method of claim 21, wherein the received electromagnetic power is distributed to each of the plurality of terminal ports in proportion to an amplitude, in the given direction, of a radiation distribution pattern associated with the respective terminal port.

23. The method of claim 19, further comprising transmitting the electromagnetic power in a form of electromagnetic radiation for reception by one or more of the plurality of antennas.

24. The method of claim 19, further comprising one or more operations selected from the group consisting of: filtering the electromagnetic power, conditioning the electromagnetic power, regulating the electromagnetic power, and managing the electromagnetic power.

25. The method of claim 19, further comprising one or more operations selected from the group consisting of: storing the rectified electromagnetic power, using the rectified electromagnetic power to supply power to a load, and using the rectified electromagnetic power to charge a battery.

* * * * *